US006256812B1

(12) United States Patent
Bartow et al.

(10) Patent No.: US 6,256,812 B1
(45) Date of Patent: Jul. 10, 2001

(54) WHEELED CARRIAGE HAVING AUXILIARY WHEEL SPACED FROM CENTER OF GRAVITY OF WHEELED BASE AND CAM APPARATUS CONTROLLING DEPLOYMENT OF AUXILIARY WHEEL AND DEPLOYABLE SIDE RAILS FOR THE WHEELED CARRIAGE

(75) Inventors: Richard J. Bartow, Battle Creek; James R. Hanson, Portage; Richard L. McDaniel, Constantine, all of MI (US)

(73) Assignee: Stryker Corporation, Kalamazoo, MI (US)

( * ) Notice: Subject to any disclaimer, the term of this patent is extended or adjusted under 35 U.S.C. 154(b) by 0 days.

(21) Appl. No.: 09/232,888

(22) Filed: Jan. 15, 1999

(51) Int. Cl.[7] .............................. A61G 1/02; B60B 11/10

(52) U.S. Cl. ......................... 5/86.1; 5/81.1 R; 280/47.16; 280/43.17

(58) Field of Search ................................. 5/81.1 R, 86.1; 280/47.16, 43, 43.17

(56) References Cited

U.S. PATENT DOCUMENTS

| | | | | |
|---|---|---|---|---|
| 934,949 | | 9/1909 | Trickey et al. . | |
| 1,102,153 | * | 6/1914 | Jürgens | 280/47.16 |
| 1,110,838 | | 9/1914 | Taylor . | |
| 1,270,383 | | 6/1918 | Crawford . | |
| 1,322,788 | * | 11/1919 | Hazelton | 280/43.17 |
| 2,295,006 | | 9/1942 | Philips . | |
| 2,563,919 | * | 8/1951 | Christensen | 280/43.17 |
| 2,585,660 | | 2/1952 | Kjos et al. . | |
| 2,935,331 | * | 5/1960 | Ledgerwood | 280/47.16 |
| 3,286,283 | | 11/1966 | Bertoldo . | |
| 3,304,116 | | 2/1967 | Stryker . | |
| 3,318,596 | | 5/1967 | Herzog . | |
| 3,932,903 | | 1/1976 | Adams et al. . | |
| 4,164,355 | | 8/1979 | Eaton et al. . | |
| 4,221,370 | | 9/1980 | Redwine . | |
| 4,426,071 | | 1/1984 | Klevstad . | |
| 4,541,622 | | 9/1985 | Tabuchi . | |
| 4,703,975 | | 11/1987 | Roberts et al. . | |
| 4,715,592 | | 12/1987 | Lewis . | |
| 4,763,910 | * | 8/1988 | Brändli et al. | 280/47.16 X |
| 5,060,327 | | 10/1991 | Celestina et al. . | |

(List continued on next page.)

FOREIGN PATENT DOCUMENTS

| | | | | |
|---|---|---|---|---|
| 2236481 | * | 2/1975 | (FR) | 5/81.1 R |

OTHER PUBLICATIONS

Stryker Model 1001, stretcher having a fifth wheel (7 photographs—A through G), Aug. 1994.

*Primary Examiner*—Michael F. Trettel
*Assistant Examiner*—Robert G. Santos
(74) *Attorney, Agent, or Firm*—Flynn, Thiel, Boutell & Tanis, P.C.

(57) ABSTRACT

A wheeled carriage for supporting a patient in a substantially horizontal position, the wheeled carriage has thereon a patient support having head and foot ends and a wheeled base supported by castered wheels. An auxiliary wheel and a wheel support structure therefor suspendedly mount the auxiliary wheel at its axis to the wheeled base at a distance L in a horizontal direction from the center of gravity of the wheeled carriage along the length of the wheeled base when the auxiliary wheel is engaged with the floor surface. A moment $M_{mass}$ is defined by the distance L multiplied by a force $F_{mass}$, the force $F_{mass}$ being defined by the mass of the carriage or carriage and patient at the center of gravity. The moment $M_{mass}$ is greater at all times than a moment $M_{force}$ to prevent teetering of the wheeled carriage, where moment $M_{force}$ is defined by multiplying the height H by a force $F_{max}$. The force $F_{max}$ is the force required to move the wheeled carriage. The height H is defined by the vertical distance between the axis of the auxiliary wheel and the relative height of the gripping location where the force $F_{max}$ is applied.

21 Claims, 18 Drawing Sheets

U.S. PATENT DOCUMENTS

| | | | | |
|---|---|---|---|---|
| 5,083,625 | * | 1/1992 | Bleicher | 280/43.17 X |
| 5,158,319 | * | 10/1992 | Norcia et al. | 280/43.17 X |
| 5,187,824 | | 2/1993 | Stryker . | |
| 5,348,326 | * | 9/1994 | Fullenkamp et al. | 280/43.17 |
| 5,806,111 | * | 9/1998 | Heimbrock et al. | 5/86.1 |
| 5,937,456 | * | 8/1999 | Norris | 5/81.1 R X |
| 5,987,671 | * | 11/1999 | Heimbrock et al. | 5/86.1 X |
| 6,016,580 | * | 1/2000 | Heimbrock et al. | 5/86.1 |

* cited by examiner

WHEELED CARRIAGE HAVING AUXILIARY WHEEL SPACED FROM CENTER OF GRAVITY OF WHEELED BASE AND CAM APPARATUS CONTROLLING DEPLOYMENT OF AUXILIARY WHEEL AND DEPLOYABLE SIDE RAILS FOR THE WHEELED CARRIAGE

FIELD OF THE INVENTION

This invention relates to a wheeled carriage for supporting a patient in a substantially horizontal position, and, more particularly, to a wheeled carriage having at least one auxiliary wheel selectively positionable with the floor surface. The auxiliary wheel can be raised or lowered by activation of control elements. In the alternative, the foot end casters can be raised and lowered by control elements to accomodate engagement of the auxiliary wheel with the floor surface. The wheeled carriage also includes brakes for selectively preventing movement of the wheeled carriage.

The invention also relates to a side rail assembly for use with the wheeled carriage. The side rail between lower stored positions and a raised deployment position to protect a patient from falling from the carriage.

BACKGROUND OF THE INVENTION

Wheeled carriages for supporting a patient in a substantially horizontal position are well-known in the art and a representative example of an early version of such a device is illustrated in Dr. Homer H. Stryker's U.S. Pat. No. 3,304,116, reference to which is incorporated herein. Dr. Stryker's innovative wheeled carriage included a fifth wheel which is raisable and lowerable by an attendant directly manually manipulating the wheel support frame oriented beneath the patient supporting portion of the wheeled carriage. The fifth wheel is positioned at substantially the center of the undercarriage such that ;usually the rear castered wheels and the fifth wheel support the carriage when the fifth wheel is deployed. However, the front castered wheels and the fifth wheel may also support a patient on the wheeled carriage depending on the position of the patient. Therefore, the wheeled carriage of U.S. Pat. No. 3,304,116 can teeter between the front and rear castered wheels when a patient is being moved thereon with the fifth wheel deployed.

U.S. Pat. No. 3,304,116 to Stryker also shows a top plate for receiving a downward force and positioning the fifth wheel in engagement with a floor surface. Such top plate is located at the top of the undercarriage location which is difficult for an attendant to reach.

A side rail assembly including side rail posts supporting side rails are well known in the art. One such side rail assembly is set forth in U.S. Pat. No. 5,187,824 to Martin Stryker. FIG. 1 thereof illustrates a top rail in a deployed position and FIG. 2 shows the top rail in a collapsed position.

In many side rail assemblies for beds, the side rail posts are made from tubular metal having diameter tolerance variations as well as a plating or a coating surface finish applied thereto. The plating or coating surface finish can extend about an outer circumference thereof. Such a finish improves the feeling and appearance of metal side rail posts. However, such finishes generally have an uneven thickness thus providing a wider range of diameters for the side rail posts. Such a finish interferes with proper seating of the side rail posts because of variations in the radius about a circumference thereof and thus changes tolerances for the posts. Therefore, the tolerances required for support structure supporting the side rail posts must be increased.

However, in general, when the support structure has increased tolerances, pushing or pulling of the deployed side rail, when patients attempt to raise themselves or when support personnel desire to move the bed, causes sway or lateral movement of the rail. Thus, because of the variations in size at the circumference of the side rail posts at their lower end, play exists between a support bracket and a conventional side rail post bolted to the bracket. Thus the side rail can sway in a direction perpendicular to the length of the side rail. Therefore, an arrangement having the side rail posts positively secured to a bracket to prevent swaying is needed.

Accordingly, it is an object of this invention to provide a wheeled carriage for supporting a patient in a substantially horizontal position having at least one auxiliary wheel spaced from the center of gravity of the wheeled carriage such that one set of the castered wheels and the deployed auxiliary wheel, in combination, support the patient during every use of the wheeled carriage generally regardless of the position of the patient.

It is a further object of this invention to provide a cam apparatus having a cam and a cam follower adjacent and below the wheeled base of the wheeled carriage for facilitating a movement of the auxiliary wheel to a position contacting the floor surface. The cam apparatus includes linkages, one linkage having a position control member. The position control member prevents the linkages of the cam apparatus from contacting the floor surface. This arrangement enables the cam apparatus to be a compact part of the wheeled base, thus allowing the wheeled carriage to move the patient support to a lowered position, as needed, to receive a patient from the floor or other location.

It is a further object of the invention to provide an alternate mechanism for raising and lowering the foot end casters to accommodate engagement of the auxiliary wheel with the floor surface.

An object of the invention is to provide a side rail assembly including a support structure for securely mounting the lower end of side rail posts to the frame of a wheeled carriage. Such an arrangement preferably includes having the side rail posts rotatable about their own axes.

SUMMARY OF THE INVENTION

The objects and purposes of the invention are met by providing a wheeled carriage for supporting a patient in a substantially horizontal position, the wheeled carriage having a center of gravity and a force $F_{mass}$ due to the mass of the carriage or the mass of a combination of the carriage and a patient thereon at the center of gravity. The wheeled carriage includes a patient support having a length, opposing ends of the length comprising a head end and a foot end of the patient support. The patient support has a pair of lateral sides intermediate the head and foot ends. The patient support is mounted on a wheeled base. The wheeled base includes at least four floor surface engaging and castered wheels spaced from one another. The wheeled base of the wheeled carriage has a first edge at a first end corresponding to the head end of the patient support and a second edge at a second end corresponding to the foot end of the patient support. A gripping device at the head end of the patient support can be used to apply a force $F_{max}$ to the carriage sufficient to overcome friction and move the wheeled carriage. An auxiliary wheel mechanism includes an auxiliary wheel support structure for suspendedly supporting at least one auxiliary wheel at an axis thereof to the wheeled base, the auxiliary wheel being uncastered. The auxiliary wheel is secured at its axis to the wheeled base at a distance L in a horizontal direction from the center of gravity along the length of the wheeled base when the auxiliary wheel engages the floor surface, a moment $M_{mass}$ being defined by the distance L multiplied by the force $F_{mass}$. The wheeled carriage includes a control apparatus for effecting a movement of the auxiliary wheel support structure and the auxiliary wheel between a first position whereat the auxiliary wheel engages the floor surface and a second position whereat the auxiliary wheel is out of engagement with the floor surface. When the auxiliary wheel is in engagement with the floor surface, the height H defined by the axis of the auxiliary wheel and the relative height of the gripping device creates a moment $M_{force}$ defined by multiplying the height H by the force $F_{max}$. The distance L is designed to be great enough such that the moment $M_{mass}$ is greater than the moment $M_{force}$ when any size and weight of patient is placed on the patient support having their head toward the head end thereof, such that the wheeled carriage does not teeter between the castered wheels on respective ends of the carriage during movement thereof.

The wheeled base of the wheeled carriage has a first edge at a first end corresponding to the head end of the patient support and a second edge at a second end corresponding to the foot end of the patient support. The wheeled base has an imaginary transverse centerline located at a midpoint of the length of the wheeled base, the distance L having a value such that, when the auxiliary wheel is engaged with the floor surface, the axis of the at least one auxiliary wheel is spaced away from the centerline located at the midpoint and toward the second edge of the wheeled base. In a preferred embodiment, the distance L is measured from the center of gravity of the wheeled base, rather than the imaginary transverse centerline.

The wheeled carriage includes a cam apparatus having a first cam linkage having a first end secured to a rotary shaft of a control apparatus and a second cam linkage secured to a second opposing end of the first cam linkage. An end of the second cam linkage is secured to a cam. A cam follower is manipulated by the cam. The cam follower is fixedly secured to the auxiliary wheel support structure. The first cam linkage has a position control member and the second cam linkage has an extended portion. The position control member and the extended portion contact one another during movement of the auxiliary wheel to prevent the linkages of the cam apparatus from contacting a floor surface.

In the alternative, the castered wheels at the foot end of the wheeled carriage are raised and lowered to accommodate engagement of the auxiliary wheel with the floor surface.

The wheeled carriage includes a side rail assembly having a bracket including first and second arms, each arm including an aperture therethrough. A first bushing is mounted through the aperture of the first arm of the bracket, and a first end of a hollow spacer is positioned adjacent the first bushing and between the first and second arms. Another bushing is positioned adjacent the opposing end of the spacer and extends through or into the aperture of the second arm of the bracket. The bushings have inner flat sides about respective inner circumferences and outer flat sides about outer circumferences thereof, and a tubular side rail post has a first end inserted into the bushings and extends through the hollow interior of the spacer, wherein insertion of the tubular side rail post elastically expands outwardly the inner flat sides of the bushings to form substantially rounded edges in the inner circumference and bows out the outer flat sides of the bushings. Elastic expansion of the inner flat sides of the bushings into a generally circular shape adjusts for variations in tolerance of the tubular side rail post. The side rail post and the support bracket therefor generally includes a coating or plating, chrome plating in this case, surface finish about an entire outer circumference thereof, the finish varying the tolerances of the dimensions of the bracket and the side rail post and thus requiring the unique support structure having the bushings.

The side rail assembly embodiment for use with a bed can include a plurality of support structures secured to the bed. A plurality of side rail posts have respective lower ends secured to respective support structures, the lower ends having an axis along a length thereof, and a side rail secured to respective upper ends of the side rail posts, wherein the side rail posts are rotatable about the axis of the lower ends thereof.

BRIEF DESCRIPTION OF THE DRAWINGS

Other objects and purposes of this invention will be apparent to persons acquainted with an apparatus of this general type upon reading the following specification and inspecting the accompanying drawings, in which.

DETAILED DISCUSSION

Figure 1:
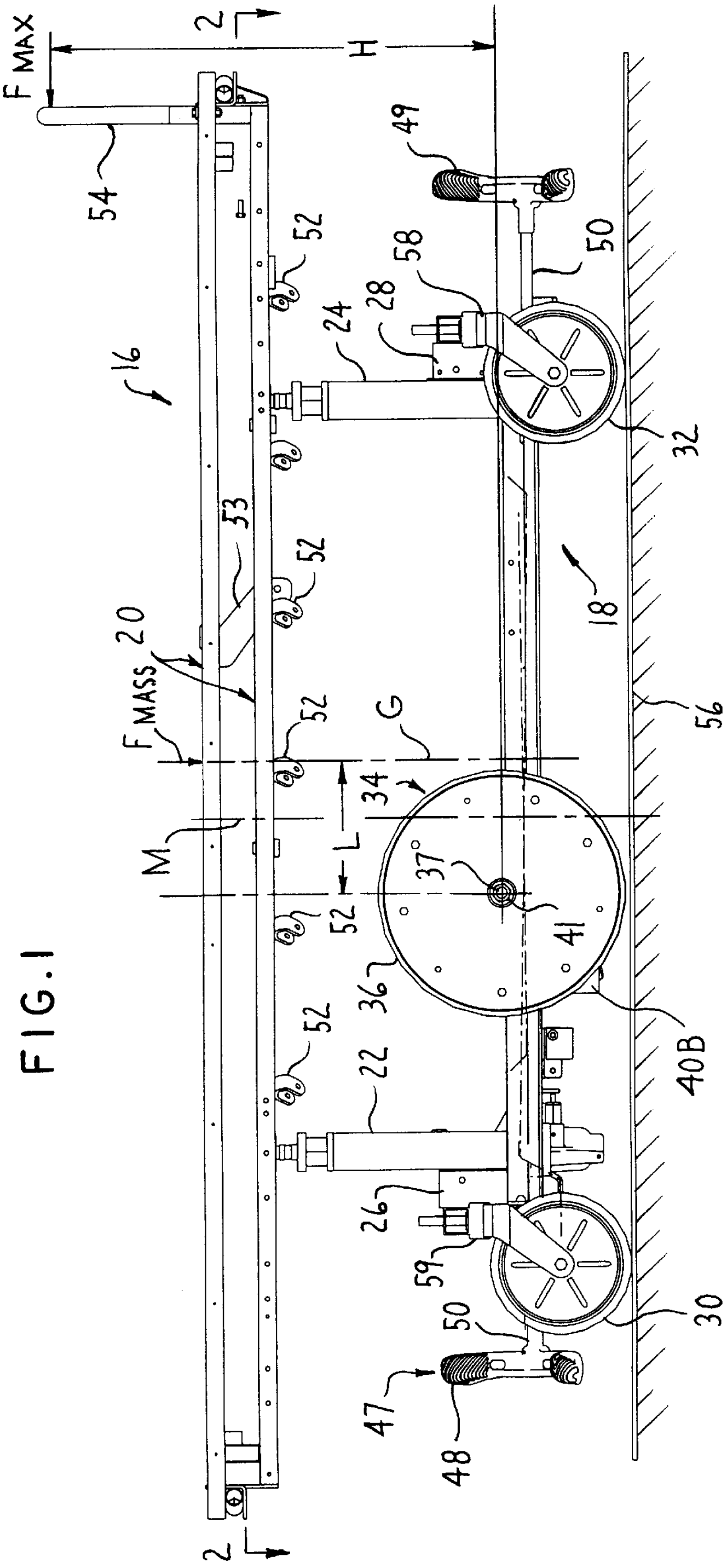
FIG. 1 is a side view of a wheeled carriage for supporting a patient in a substantially horizontal position and embodying the invention.

Certain terminology will be used in the following description for convenience in reference only and will not be limiting. The words "up", "down", "right" and "left" will designate directions in the drawings to which reference is made. The words "in" and "out" will refer to directions toward and away from, respectively, the geometric center of the wheeled carriage and designated parts thereof. Such terminology will include derivatives and words of similar importance.

Figure 2:
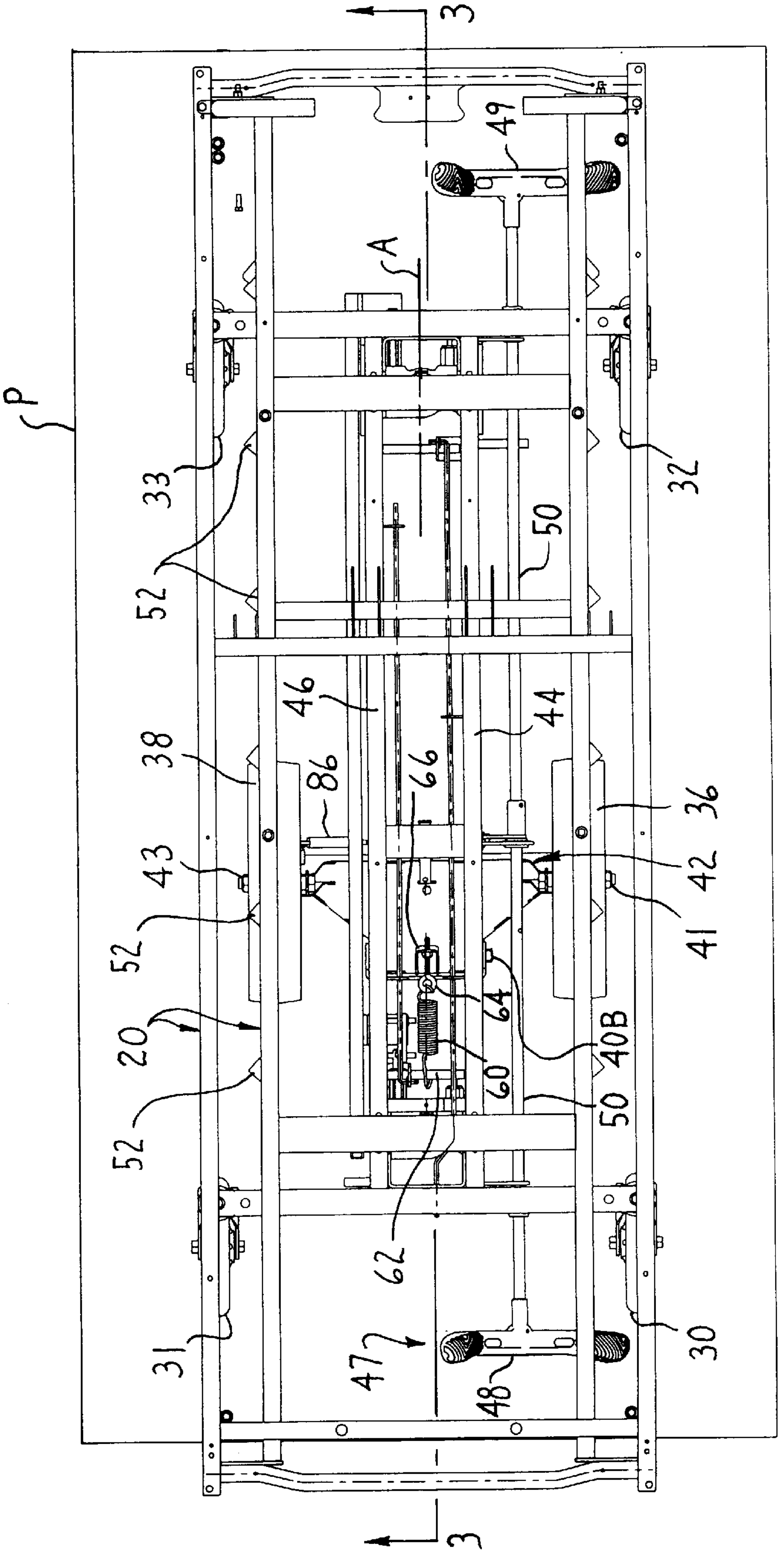
FIG. 2 is a top view of the wheeled base and some of the support elements of the aforesaid wheeled carriage illustrated in FIG. 1 with the patient support structure having been removed.

FIG. 1 is an illustration of a wheeled carriage 16 for supporting a patient in a substantially horizontal position. A known wheeled carriage is disclosed in Dr. Homer H. Stryker's U.S. Pat. No. 3,304,116. The wheeled carriage 16 of FIG. 1, includes a wheeled base 18, a patient support 20 and a pair of hydraulically operated jacks 22 and 24 interposed between the wheeled base 18 and the underside of the patient support 20. The jacks 22 and 24 are mounted to the wheeled base 18 and are fixedly secured in place by brackets 26 and 28, respectively. A plurality of castered wheels 30, 31, 32, 33, are provided on the wheeled base 18 at the four corners thereof defining a theoretical polygon P, in this case, a rectangle as shown in FIG. 2. The orientation of the wheels 30–33 is similar to that illustrated in Dr. Stryker's aforementioned patent. All of the aforesaid structure is generally conventional and forms the environment for the invention which will be discussed in more detail below.

An auxiliary wheel mechanism 34 is provided on the wheeled base 18 and, in this particular embodiment, is oriented so that its plane of rotation is fixed and parallel to a longitudinal axis A of the wheeled base 18. The auxiliary wheel mechanism 34 includes a pair of fifth and sixth auxiliary wheels 36, 38 having respective axes 37, 39, and an auxiliary wheel support structure 40 for interconnecting the auxiliary wheels 36, 38 to the wheeled base 18. The auxiliary wheels 36, 38 are connected to the support structure at respective axles 41, 43 corresponding to the location of axes 37, 39. The support structure 40 includes a yoke 42 pivotally secured via a bracket 40A and axle 40B to a pair of horizontally spaced longitudinally extending frame members 44 and 46 of the wheeled base 18. Axles 41, 43 are provided at opposed lateral sides of the yoke 42 as shown in FIG. 2.

In the particular embodiment of FIG. 1, a control apparatus 47 includes manually manipulatable members such as foot pedals 48, 49 secured at opposing ends of a rotatable shaft 50 of the wheeled base 18. As shown in FIG. 2, the rotatable shaft 50 extends beyond the length of the wheeled base 18. Either of the foot pedals 48, 49 can be utilized to set a brake or adjust the position of the auxiliary wheels 36, 38 of the wheeled carriage 16 by rotating the shaft 50, as will be described in more detail later.

Side rail brackets 52 extending along an edge of the patient support 20 enable mounting of side rails to the wheeled carriage 18. Such brackets 52 having downwardly extending flanges, with respective first and second spaced openings therein, are well known in the art to support side rails. Such an arrangement is set forth in U.S. Pat. No. 5,187,824 issued Feb. 23, 1993 and is hereby incorporated by reference in its entirety. Therefore, explanation of the features of the side rails is not detailed herein. Crossing bracket 53 secures portions of the patient support 20 to each other.

A handle 54 in FIG. 1 enables a handler or driver of the wheeled carriage 16 to push the carriage in selected directions. Turning of the wheeled carriage 16 is simplified when the auxiliary wheels 36, 38 are deployed onto a floor surface 56. This is so, because the auxiliary wheels 36, 38 are not castered, and are relatively large compared to the other castered wheels 30–33 of the wheeled base 18 and the resulting shorter wheelbase between the wheels 32, 33 and 36, 38.

The handle 54 can be replaced by an end rail or any other known gripping device enabling persons to move or push the wheeled carriage 16. Even the frame of the patient support 20 can be utilized as the gripping device in some embodiments.

As shown in FIG. 1, a force $F_{mass}$ is applied to the wheeled carriage 16 along a line G representing the center of gravity of the carriage with or without a patient thereon. The force $F_{mass}$ equals the sum of the overall mass of the wheeled carriage 16 with or without a patient thereon, depending upon the situation. Likewise, the center of gravity (line G) can vary depending upon the position of the patient on the wheeled carriage 16 or the location of other equipment such as batteries, oxygen tanks, or other devices secured to the wheeled base 18, the patient support 20, or other parts of the wheeled carriage. These factors can cause variations for the location of the center of gravity G for the wheeled carriage 16.

Figure 11:
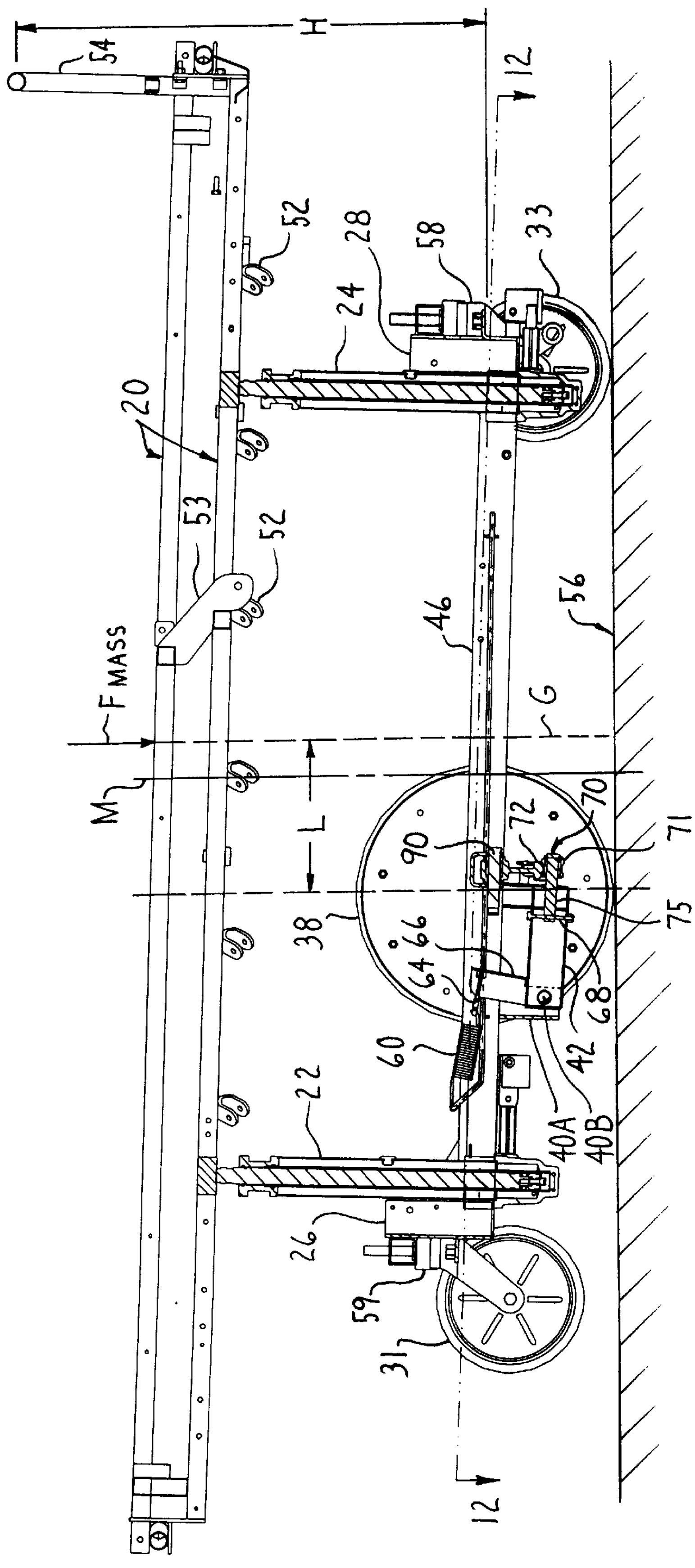
FIG. 11 is a sectional view similar to the view shown in FIG. 3, except that the auxiliary wheel is in a lowered position and contacting the floor surface.
Figure 12:
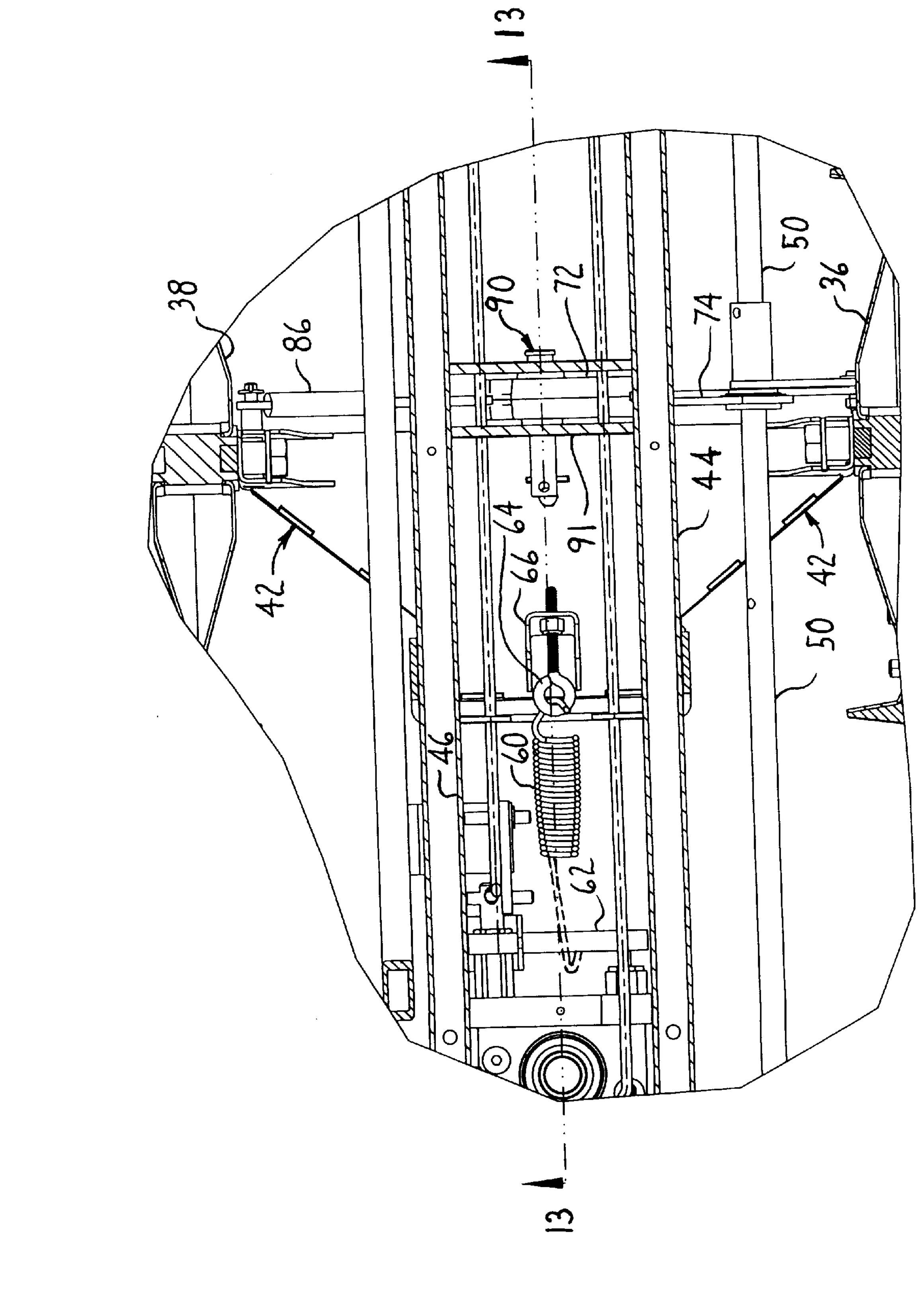
FIG. 12 is an enlarged view of a fragment of the wheeled base similar to the view of FIG. 9 showing the cam apparatus and surrounding elements adjacent the auxiliary wheels except the auxiliary wheel is in the lowered position.

A force $F_{max}$, shown in FIG. 1, represents the force required to move the wheeled carriage 16 when the auxiliary wheels 36, 38 are deployed in contact with the floor surface 56. The force $F_{max}$ is the force required to overcome the friction of the auxiliary wheels 36, 38 and the friction of the castered wheels 32, 33. Because of the larger diameter, and because the auxiliary wheels 36, 38 are uncastered, the auxiliary wheels decrease the amount of force $F_{max}$ required to move the wheeled carriage 16 as compared to a carriage only having the castered wheels 30–33. Such an arrangement is shown in FIGS. 1 and 11.

More importantly, when the auxiliary wheels 36, 38 are deployed and the wheeled carriage 16 is utilized, one must be sure that the carriage does not teeter between the castered wheels 30, 31 at a first end or foot end, and the castered wheels 32, 33 at a second end or head end of the wheeled carriage. Such teetering during use could be uncomfortable to the patient, annoying to the clinician and even prevent proper cardio-pulmonary resuscitation of the patient.

To prevent teetering of the wheeled carriage 16, the axes 37, 39 of the auxiliary wheels 36, 38 are spaced from the center of gravity G of the carriage by a horizontal distance L along the length of the wheeled base 18 corresponding to the longitudinal axis A thereof. In this manner, a moment $M_{mass}$ defined by multiplying the distance L times the force $F_{mass}$ at the center of gravity can be calculated. Such a moment $M_{mass}$ resists elevation of the castered wheels 32, 33 and ensures the castered wheels 30, 31 remain elevated when the auxiliary wheels 36, 38 are deployed.

Height H represents the vertical distance between the axes 37, 39 of the auxiliary wheels 36, 38 and the vertical height of the handle 54. A moment $M_{force}$ is created when a user pushes the wheeled carriage 16 with a force $F_{max}$ to move the wheeled carriage in a horizontal direction. The force $F_{max}$ is limited, as described earlier, to the maximum possible amount of humanly applied force needed to overcome the friction of the wheels 32, 33, 36, 38 supporting the wheeled carriage 16 and to effect a desired acceleration of the wheeled carriage 16.

In use, the moment $M_{mass}$ must always be greater than the moment $M_{force}$ to prevent teetering of the wheeled carriage 16. Therefore, the axes 37, 39 of the auxiliary wheels 36, 38, are spaced in the horizontal direction away from the center of gravity of the wheeled carriage 16 the distance L sufficient to prevent the moment $M_{force}$ from becoming greater than the moment $M_{mass}$ and teetering the wheeled carriage. Therefore, the axes 37, 39 of the auxiliary wheels 36, 38 are spaced a sufficient distance from the center of gravity to ensure that the moment $M_{mass}$ always is greater than the moment $M_{force}$.

The distance L from the center of gravity G to the auxiliary wheels 36, 38 is sufficient to ensure that the wheeled carriage 16 will not teeter even if the center of gravity G shifts a distance due to the weight of the patient. Likewise, the distance L is sufficient to overcome any negative effects due to the line G defining the center of gravity moving because of placement of the wheeled carriage 16 on a ramp or other angled floor surface when transporting a patient.

Generally, the distance L must be great enough so that the axes 37, 39 of the auxiliary wheels 36, 38 are located beyond a vertical midpoint line M of the wheeled base 18 dividing the wheeled base into two sections of equal length as shown in FIG. 1. FIG. 1 shows the axis 37 spaced beyond the midpoint line M and away from the line G representing the center of gravity. Therefore, when the auxiliary wheels 36, 38 are deployed, the wheeled carriage 16 of FIG. 1 will not teeter during use.

FIG. 1 shows the axis 37 spaced a short distance from the midpoint line M of the wheeled base 18, and away from the center of gravity G. The distance of such spacing of the axis 37 from the midpoint line M can be greater. For example, the axes 37, 39 of the auxiliary wheels 36, 38 can be spaced from a first edge 58 on a longitudinal end of the wheeled base 18 corresponding to the end of the patient support 20 for supporting the head of the patient and toward a second edge 59 of the wheeled base corresponding to the end of the patient support 20 corresponding to the feet of the patient.

In some embodiments, the axis 37 of the auxiliary wheel 36 can be spaced toward the second edge 59 of the wheeled base 18 a distance corresponding to at least 15% of the distance from the midpoint line M of the wheeled base toward the second edge. In a most preferred embodiment, the axis 37 of the auxiliary wheel 36 is located on the wheeled base 18 at a position corresponding to about two-thirds of the length of the wheeled base. Of course, the above lengths or distances are calculated when the auxiliary wheels 36 are deployed on the floor surface 56 and thus support the wheeled carriage 16 as shown in FIG. 11.

Figure 3:
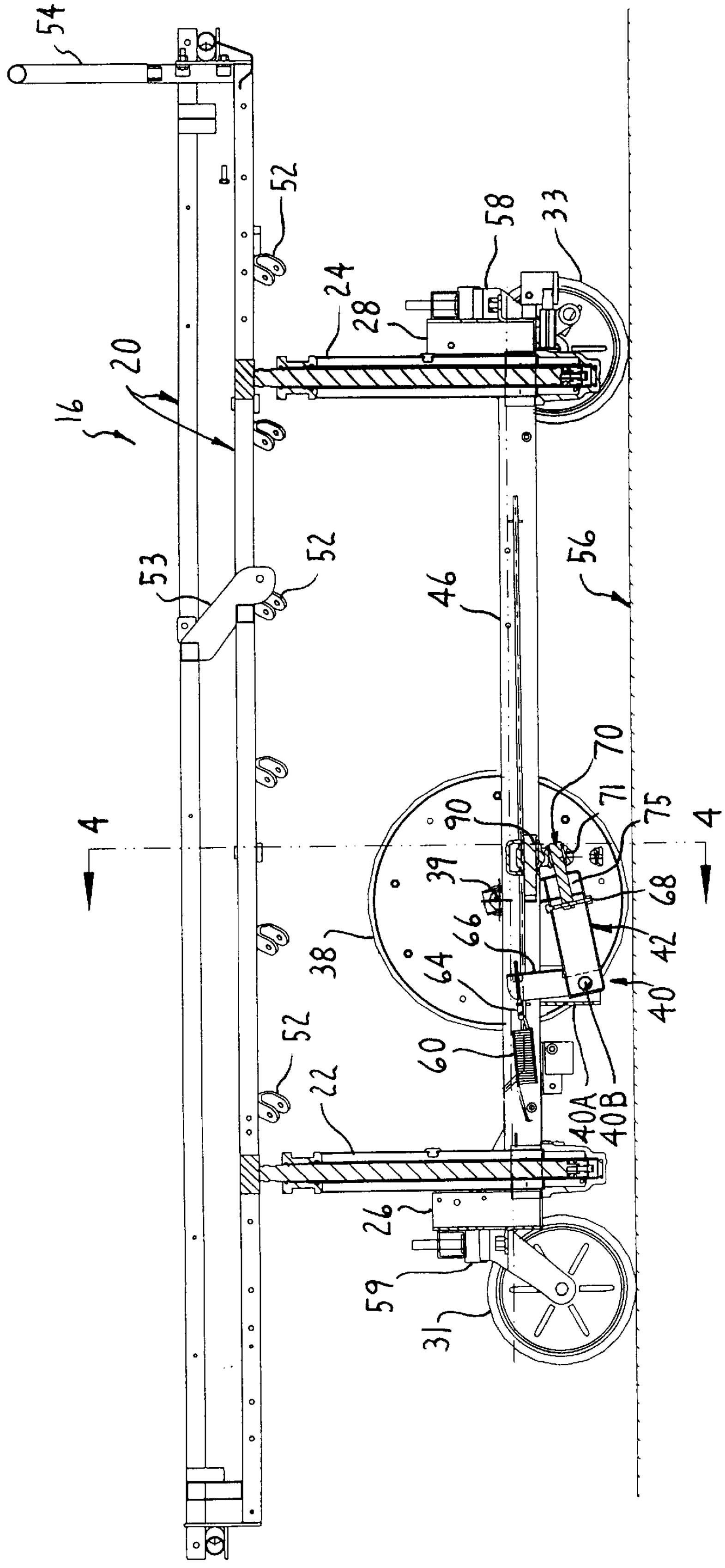
FIG. 3 is a sectional view of one side of the wheeled carriage taken at 3—3 of FIG. 2 and having the auxiliary wheel in a raised position.
Figure 9:
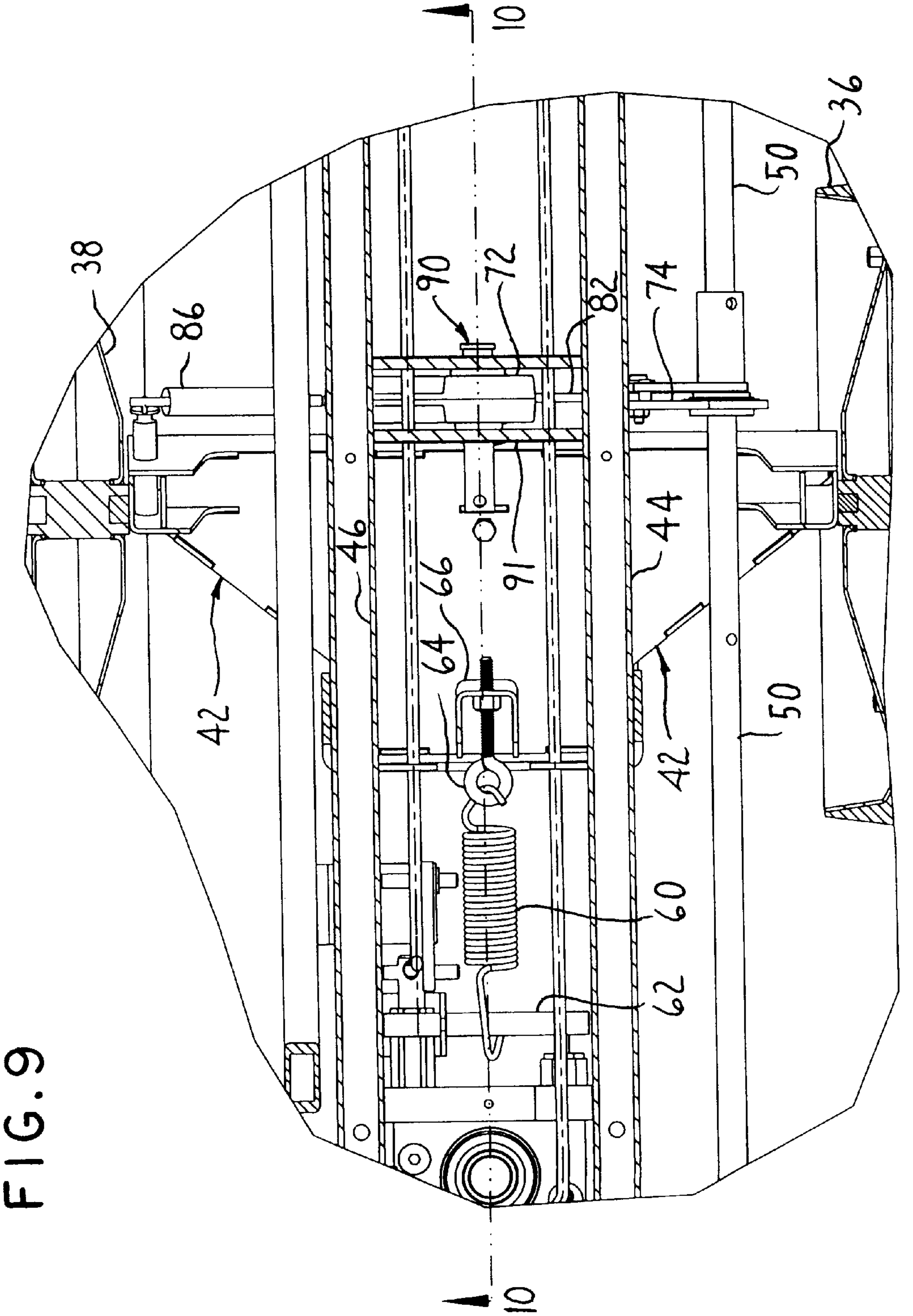
FIG. 9 is an enlarged top view of a fragment of the wheeled base of FIG. 2 showing the cam apparatus and surrounding elements adjacent the auxiliary wheels when the auxiliary wheels are in the raised position.
Figure 10:
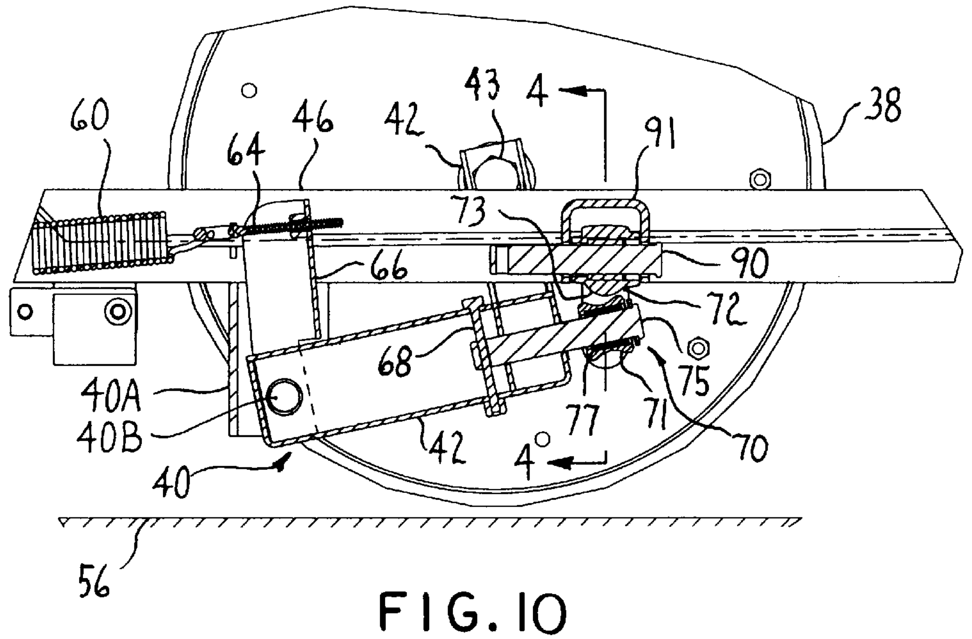
FIG. 10 is a sectional view of the cam apparatus and the auxiliary wheel support structure supporting the auxiliary wheel in a raised position and taken at 10—10 of FIG. 9.
Figure 13:
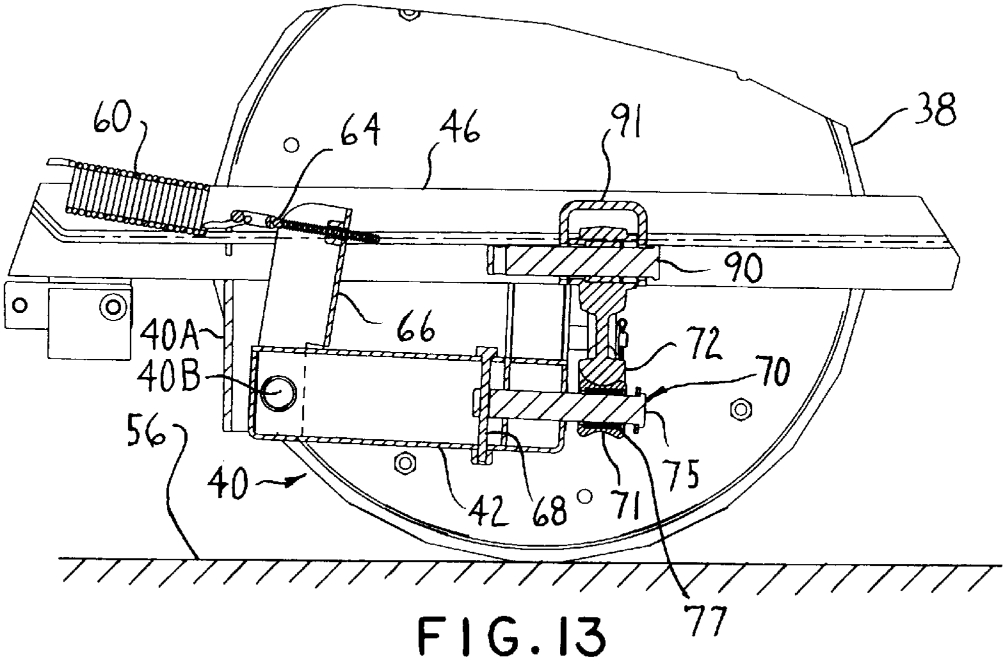
FIG. 13 is a sectional view of the cam apparatus and the auxiliary wheel support structure supporting the auxiliary wheel in a lowered position contacting the floor surface and taken at 13—13 of FIG. 12.

FIG. 3 shows details of the auxiliary wheel support structure 40. Return spring 60 supports the auxiliary wheels 36, 38 in the raised position shown in FIGS. 1 and 3. The return spring 60 connects at one end to a spring cross support 62 as shown in FIGS. 2 and 9. FIGS. 2 and 9 further show the other end of the return spring 60 secured to an eyelet bolt 64 having an adjusting nut thereon. The eyelet bolt 64 connects to a U-shaped linkage element 66 fixedly connected to the yoke 42. The U-shaped linkage element 66 is fixedly secured to the central part of the yoke 42. While FIGS. 10 and 13 show the linkage element 66 as a separate element secured to the yoke 42, the linkage element 66 can be an integral part of an L-shaped section of the yoke 42. As shown in FIGS. 3 and 11, the linkage element 66 and the yoke 42 are fixedly secured so that the return spring 60 can raise the yoke when cam follower 70 is in the raised position of FIG. 3. The yoke 42 supports the auxiliary wheels 36, 38 on opposing lateral sides thereof as partially illustrated in FIG. 4. As shown in FIGS. 3, 10 and 13, the yoke 42 includes a securement element 68 fixedly securing an axle 75 of the cam follower 70 thereto. In response to movement upwardly or downwardly of the cam follower 70 about the axle 40B, caused by movement of a cam 72, the yoke 42 pivots or moves, raising or lowering the auxiliary wheels 36, 38. In the position shown in FIG. 3, the cam follower 70 is in a raised position, and the return spring 60 ensures the cam follower and thus the auxiliary wheels 36 and 38 will stay in such a raised position. Further, when the cam follower 70 is released from a lower position on the cam 72, the return spring 60, the eyelet bolt 64, and the fixedly secured U-shaped linkage element 66 of the yoke 42 enable the yoke to be raised such that the auxiliary wheels 36, 38 do not contact the floor surface 56.

Figure 4:
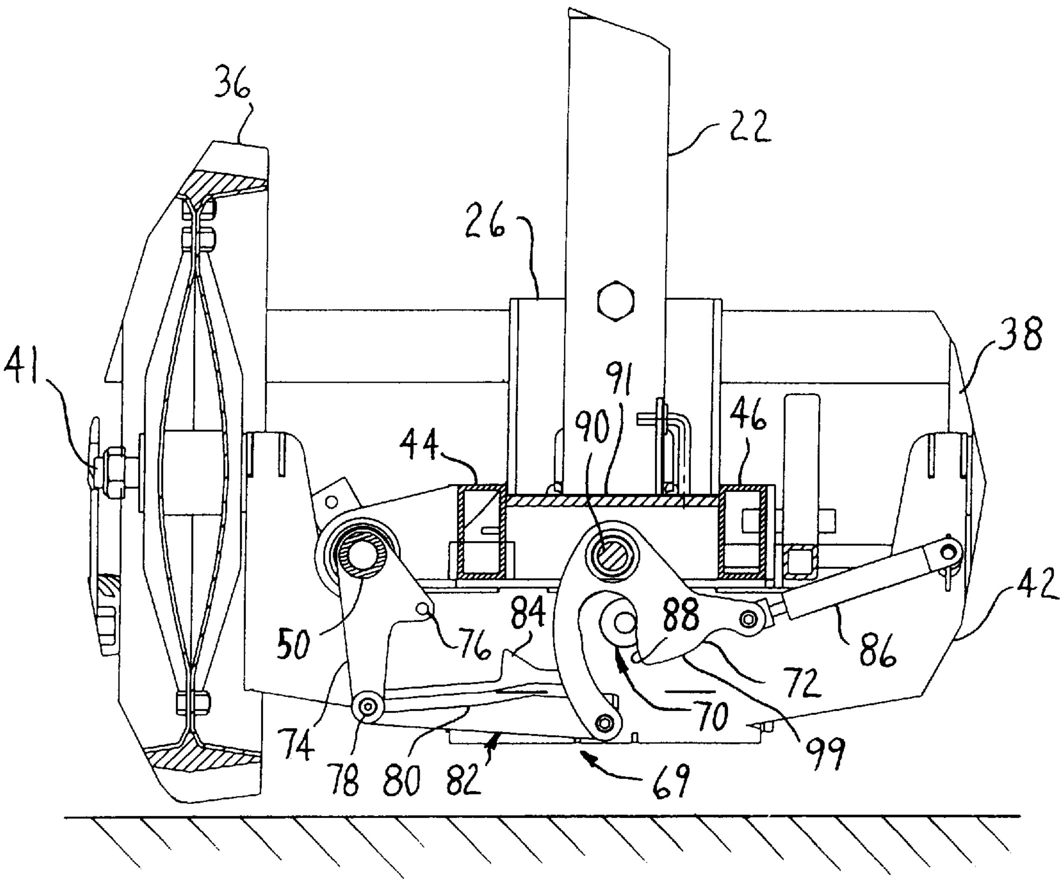
FIG. 4 is an enlarged sectional view of a fragment taken at 4—4 of FIG. 3 showing the cam apparatus when the auxiliary wheel is in the raised position.

FIG. 4 shows a front view of a cam apparatus 69, which includes the aforementioned cam follower 70 and the cam 72. The auxiliary wheel support structure 40 is in a raised position, in FIG. 4, so that the auxiliary wheels 36 and 38 do not touch the floor surface 56. The rotatable shaft 50 secures to a first end of a cam linkage 74 having a position control member 76 thereon. A second end of the cam linkage 74 has a pin or roller element 78 secured thereto. The pin or roller element 78 mounts through a closed slot 80 in a slotted cam linkage 82. The closed slot 80 extends through a substantial portion of the length of the slotted cam linkage 82. The slotted cam linkage 82 also includes an extended portion 84 on the top thereof. The extended portion 84 of the slotted cam linkage 82 is aligned to physically contact the position control member 76 as will be described in more detail with respect to FIGS. 5–8. Dashpot 86 secured to one end of the cam 72 prevents the cam from moving too forcefully in response to the weight on the auxiliary wheels 36 and 38 when the cam follower 70 moves past a dead center raised part 99 and when the cam roller 70 enters an open slot 88 of the cam 72. The cam 72 pivots about a cam axle 90 secured to a cam support bracket 91 when moving the cam follower 70 to raised and lowered positions.

Figure 5:
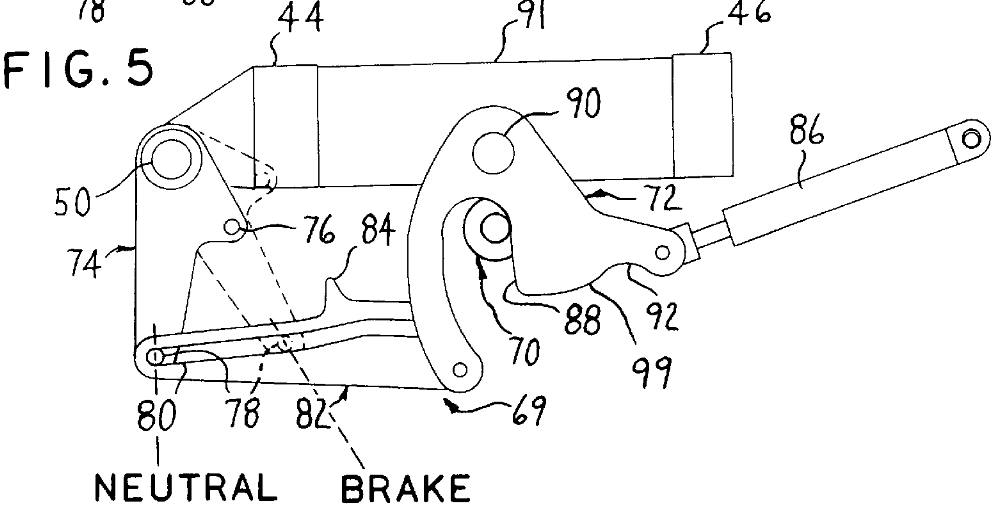
FIG. 5 is a front view of the cam apparatus where the cam follower has been moved toward a cam surface location placing the auxiliary wheel in a raised position, the auxiliary wheels and other elements being removed, to better show the cam apparatus.

FIGS. 5–8 merely show the operation of the cam apparatus 69 including the cam 72 and the cam follower 70 as well as the linkages 74, 82 from the control apparatus 47 defined by the rotatable shaft 50 that operates the auxiliary wheel support structure 40 to raise and lower the auxiliary wheels 36, 38. FIG. 5 corresponds to the view of FIG. 4 (wheels raised) except that the elements of the auxiliary wheel support structure 40, such as the yoke 42, have been removed for purposes of clarity.

Figure 6:
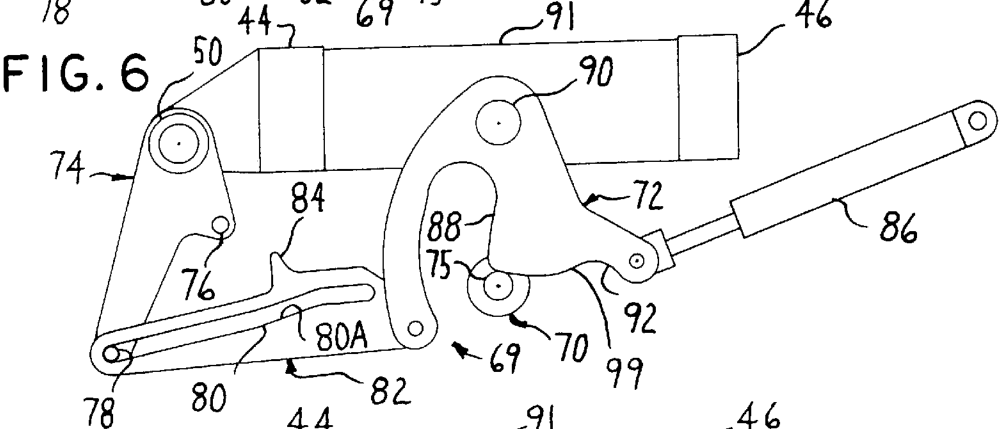
FIG. 6 is a front view of the cam apparatus and similar to the view of FIG. 5 except that the cam follower is at the portion of the cam surface leading to the lowered position for the auxiliary wheel.

In operation, and to effect a lowering of the auxiliary wheels 36, 38, the rotatable shaft 50 is rotated in a clockwise direction from the neutral position shown in FIG. 5. The rotatable shaft 50 is fixedly secured to the cam linkage 74 and thus rotates the cam linkage 74 as shown in FIG. 6. The pin or roller element 78 of the cam linkage 74 moves along the closed slot 80 of the slotted cam linkage 82. Movement of the cam linkages 74 and 82 toward the left in FIG. 6 causes the cam 72 to pivot clockwise to the left and thus the cam follower 70 rolls, moving the cam follower 70 downward. As the cam 72 rotates in a clockwise direction about the axle 90, or pivots to the left, the dashpot 86 is slowly extended.

Figure 8:
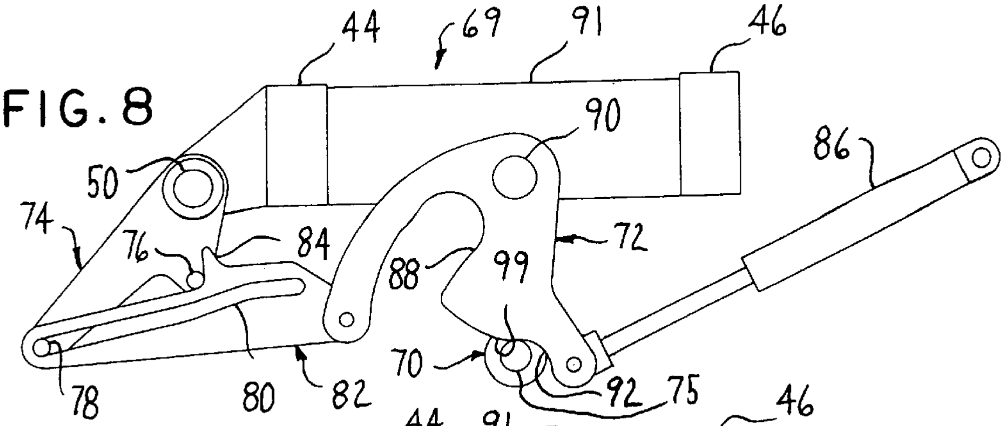
FIG. 8 is a front view similar to the view of the cam apparatus of FIG. 7, except the cam follower is detented into the lowered position thus retaining the auxiliary wheel in contact with the floor surface.

As the cam follower 70 leaves the open slot 88 of the cam 72, it is moved past the raised part 99 on the cam 72 and into a depression 92 as shown in FIG. 8 corresponding to a wheels lowered position corresponding to FIG. 13.

As shown in FIG. 8, when the cam follower 70 reaches an extended position, the cam follower rests in the depression 92 in the surface of the cam 72. In this position, the auxiliary wheel support structure 40 has moved to a lower position, and with the downward movement of the axle 75 of the cam follower 70, the auxiliary wheels 36, 38 contact the floor surface 56.

Figure 7:
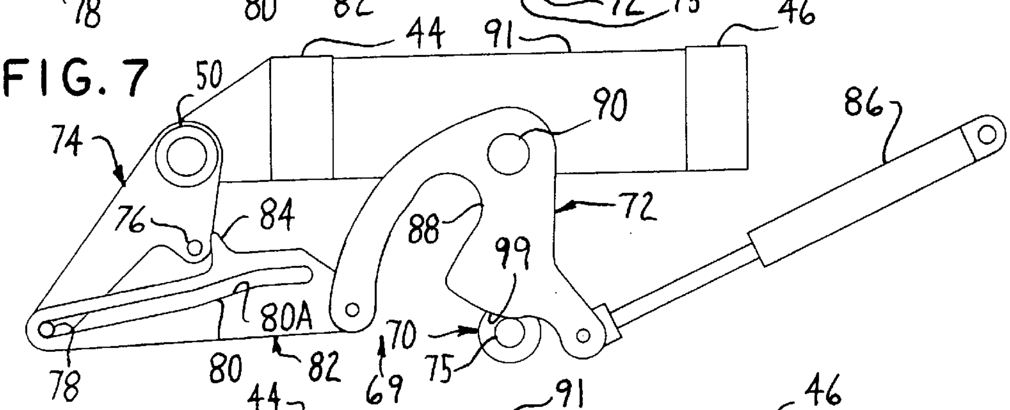
FIG. 7 is a front view of the cam apparatus and similar to FIG. 6 except the cam follower has moved to the lowered wheel position.

When the auxiliary wheel support structure 40 is released and is to be returned to the raised position shown in FIGS. 4, 5 and 10, the rotatable shaft 50 (FIG. 8) rotates in a counterclockwise direction and the elements described above move in opposite directions. The extended portion 84 of the slotted cam linkage 82 contacts the position control member 76 of the cam linkage 74 as shown in FIG. 7. Contact between the position control member 76 and the extended portion 84 prevents the linkage 82 from pivoting downwardly and contacting the floor surface 56. Therefore, the control member 76 and the extended portion 84 perform the important function of preventing failure or damage to the cam linkages 74, 82. Furthermore, the control member 76 and the extended portion 84 also enable the elements of the cam apparatus 69 to fit in a lower, smaller, more compact area. Such an arrangement requires less space between the bottom of the jacks 22, 24 and the floor surface 56. Therefore, the patient support 20 can be lowered farther or closer to the floor surface 56 on the hydraulic jacks 22, 24 than many other wheeled carriages 16. In addition, and more importantly, the position control member 76 serves to push on the extended portion 84 to push the cam 72 counterclockwise to force the cam follower 70 out of the depression 92 and past the raised part 99. Further, the length of the slot 80 facilitates rapid deployment of the brake when in, for example, the FIG. 6 position of movement, in response to a rapid counterclockwise rotation of the linkage 74 to the broken line position in FIG. 5, without having to wait for the cam 72 to return to the fully returned position illustrated in FIG. 5. The angled section 80A of the slot prevents the linkage 82 from striking the floor. The dashpot 86 prevents the return spring 60 and the weight of the patient and wheeled carriage from driving the cam follower 70 upwardly fast or quickly, when the cam follower passes the raised part 99 and reaches the open slot 80 of the cam 72. The dashpot 86 slows the descent of the wheeled carriage back onto all four casters and enables return of the auxiliary wheel support structure 40 to a raised position in a controlled manner.

FIG. 10 shows the auxiliary wheel support structure 40 in a raised position. FIG. 10 also illustrates a contoured or rounded surface 73 of the cam 72. The surface 73 of the cam 72 is rounded along its entire contact surface with the cam follower 70, including the open slot 80 and the depression 92. In this manner, the surface 73 of the cam 72 mates with the surface of the cam follower 70.

As shown in FIG. 10, the cam follower 70 has extended edges along both sides thereof. Bearings 77 secure the cam follower to the axle 75 enabling rotation of the cam follower. The surface of the cam follower 70 matches or fits the surface 73 of the cam 72. The main reason for this arrangement is because of the movement or pivoting of the axle 75 of the cam follower 70, depending on the position of the auxiliary wheels 36, 38. This movement is clear from a comparison of the auxiliary wheel support structure 40 of FIG. 10 with the section view of FIG. 13 showing the auxiliary wheel support structure 40 in the lowered position. As the elements 66, 42, and 70 are moved as a unit to lower the auxiliary wheel 38, the cam follower 70 rotates or pivots a significant amount. By having contoured mating surfaces on the cam 72 and the cam follower 70, any problem in functioning of the auxiliary wheel support structure 40 in moving between the lowered and raised positions is obviated.

FIG. 11 is similar to the view of FIG. 3, except the auxiliary wheel 38 is in a lowered position supporting the wheeled carriage 16. The distances and forces set forth in FIG. 1 for the force $F_{mass}$ at the center of gravity, distance L in a horizontal direction between the axis of the auxiliary wheels, the height H representing the vertical distance between the axes 37, 39 of the auxiliary wheels and the handle 54, and the force $F_{max}$ capable of moving the wheeled carriage 16 in a horizontal direction, are all similar to the values set forth in FIG. 1. FIG. 11 better shows the various forces and moments for the wheeled carriage 16 having auxiliary wheels 36, 38 deployed to contact the floor surface 56. As stated before, the moment $M_{mass}$ must always be greater than the moment $M_{force}$ to prevent teetering of the wheeled carriage 16. Therefore, the axes 37, 39 of the auxiliary wheels 36, 38, are spaced in the horizontal direction away from the center of gravity of the wheeled carriage 16, the distance L sufficient to prevent the moment $M_{force}$ from becoming greater than the moment $M_{mass}$ and teetering the wheeled carriage. This spacing or distance L is great enough to ensure that the moment $M_{mass}$ always is greater than the moment $M_{force}$. The axes 37, 39, also have the same distance from the center of gravity and actually form the same line if extended toward each other. Therefore, the auxiliary wheels 36, 38 are parallel with respect to each other.

Figure 14:
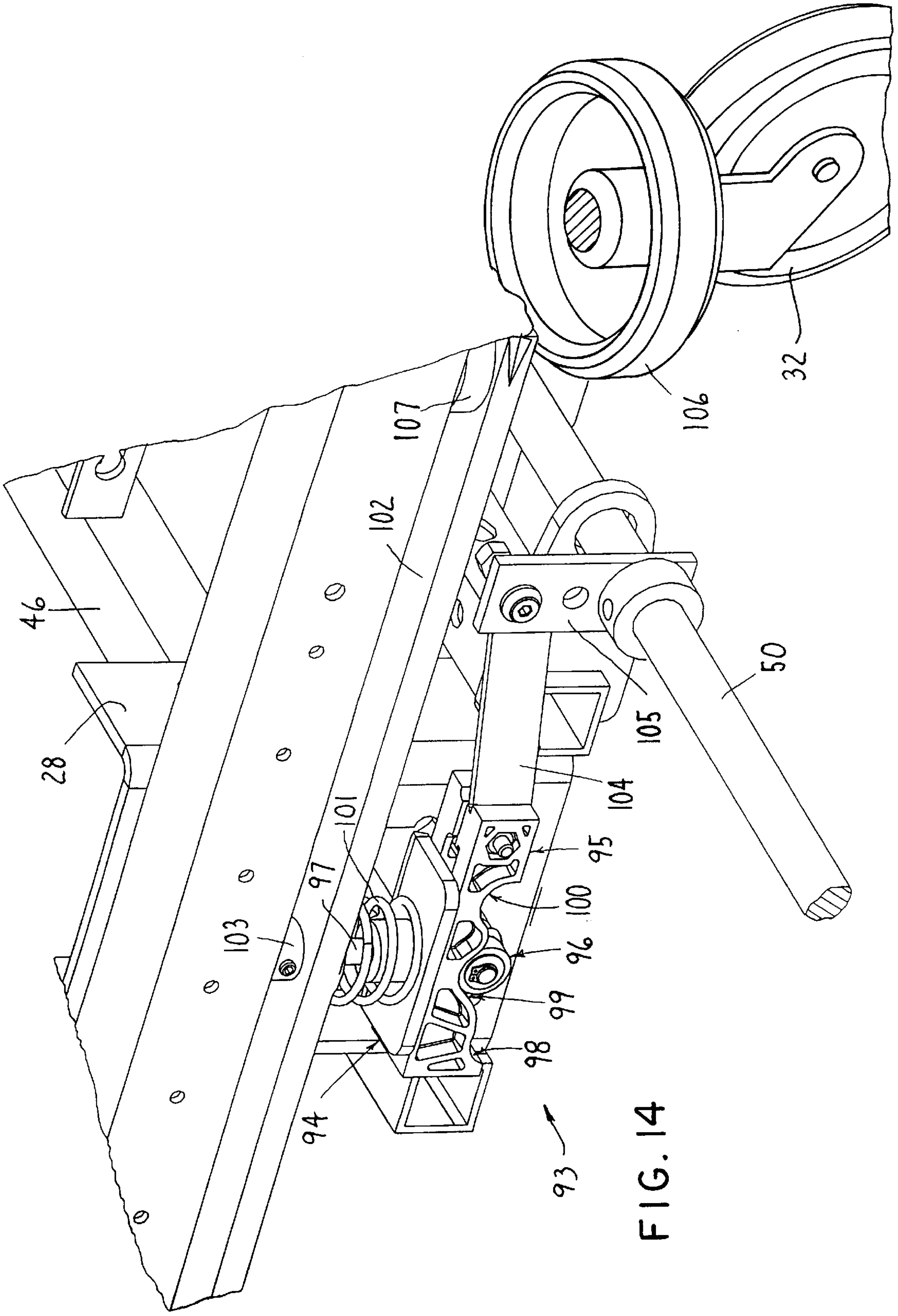
FIG. 14 is an enlarged isometric view of a brake activation structure.

FIG. 14 shows a view of a brake activation structure 93 for the wheeled carriage 16. The brake activation structure 93 generally can be located near the brackets 26 and 28 in FIG. 1.

Much of the detail of the brake activation structure 93 is disclosed in copending application Ser. No. 09/003,777, titled Unitary Pedal Control Of Brake And Fifth Wheel Deployment Via Side And End Articulation With Additional Unitary Pedal Control of Height Of Patient Support, filed Jan. 7, 1998, the disclosure of which is hereby incorporated by reference.

As shown in FIG. 14, the bracket 28 on the wheeled base 18 has thereon structure that defines a guideway 94. Only one such guideway 94 is illustrated in FIG. 14. The guideway 94 slidably supports a catch or slide mechanism 95 lengthwise of the guideway 94, in a direction that is lateral to the longitudinal axis A. A latch in the form of a roller 96 is rotatably supported on the lower end of a vertically reciprocal rod 97 and is adapted to roll along a lower edge of the catch mechanism 95 between respective recesses 98, 99 and 100 in the aforesaid lower edge of the catch mechanism 95. The latch or the roller 96 is capable of vertical movement against the continual urging of a compression spring 101, a lower end of which abuts the guideway 94 as shown in FIG. 14. An upper end of the rod 97 passes through a hole (not shown) in a brake bar 102 and has a collar 103 secured thereto on a side of the brake bar 102 remote from the spring 101. A link 104 interconnects one end of the catch mechanism 95 to a lever arm 105 fixedly secured to the rotatable shaft 50 and is movable therewith. As a result, a clockwise rotation of the shaft 50 will not activate a deployment of the auxiliary wheel 38 but will, instead, cause the lever arm 105 to move therewith and apply a pulling force to the aforesaid one end of the catch mechanism 95 through the interconnecting link 104 to cause the roller 96 to roll on the edge of the catch mechanism 95 out of the central recess 99 and into the recess 98 while the compression spring 101 maintains the engagement of the contoured edge of the catch mechanism 95 with the roller 96. The rod 97 and the brake bar 102 will be pulled downwardly against the urging of the spring 101 to lower the rings 106 on the opposite ends of the brake bar 102 into engagement with the castered wheels 32, 33 in a known manner. The brake rings 106 prevent any movement of the castered wheels. Deactivation of the brake rings 106 can be accomplished by a reverse rotation of the foot pedals 48, 49 such that upward movement of the brake bar 102 will occur, while bumpers 107 dampen unwanted metal to metal contact noise. A counterclockwise rotation of the shaft 50 will cause the link 104 to push the catch mechanism 95 to the left and cause the roller 96 to enter the recess 100. In this position, the auxiliary wheels 36, 38 are deployed as described earlier. On the other hand, a movement of the roller 96 into the central recess 99 places the pedals 48, 49 into a neutral position where neither the brake rings 106 nor the auxiliary wheels 36, 38 are deployed.

While two of the auxiliary wheels 36, 38 are shown throughout the drawings, a single auxiliary wheel may be utilized in some embodiments. At least one auxiliary wheel is required for the invention to function properly.

In the alternative, the castered wheels 30, 31 adjacent the foot end of the wheeled carriage can be supported for elevatable movement so that when lowered, the auxiliary wheels 36, 38 will be elevated above the floor (FIG. 1) and when elevated or retracted away from the floor, the auxiliary wheels 36, 38 will be in engagement with the floor (FIG. 11). This could be accomplished, for example, by vertically adjustably mounting the bracket 26 to which the wheels 30, 31 would be mounted to the adjacent jack 22 by means of a separate jack or like cam operated device (not shown).

AUXILIARY SIDE RAIL ASSEMBLY

Side rail assemblies 118, 119 of the embodiment of FIGS. 15–22 provide improved strength for the side rail assemblies in a lateral direction across the bed or wheeled carriage 16.

Figure 15:
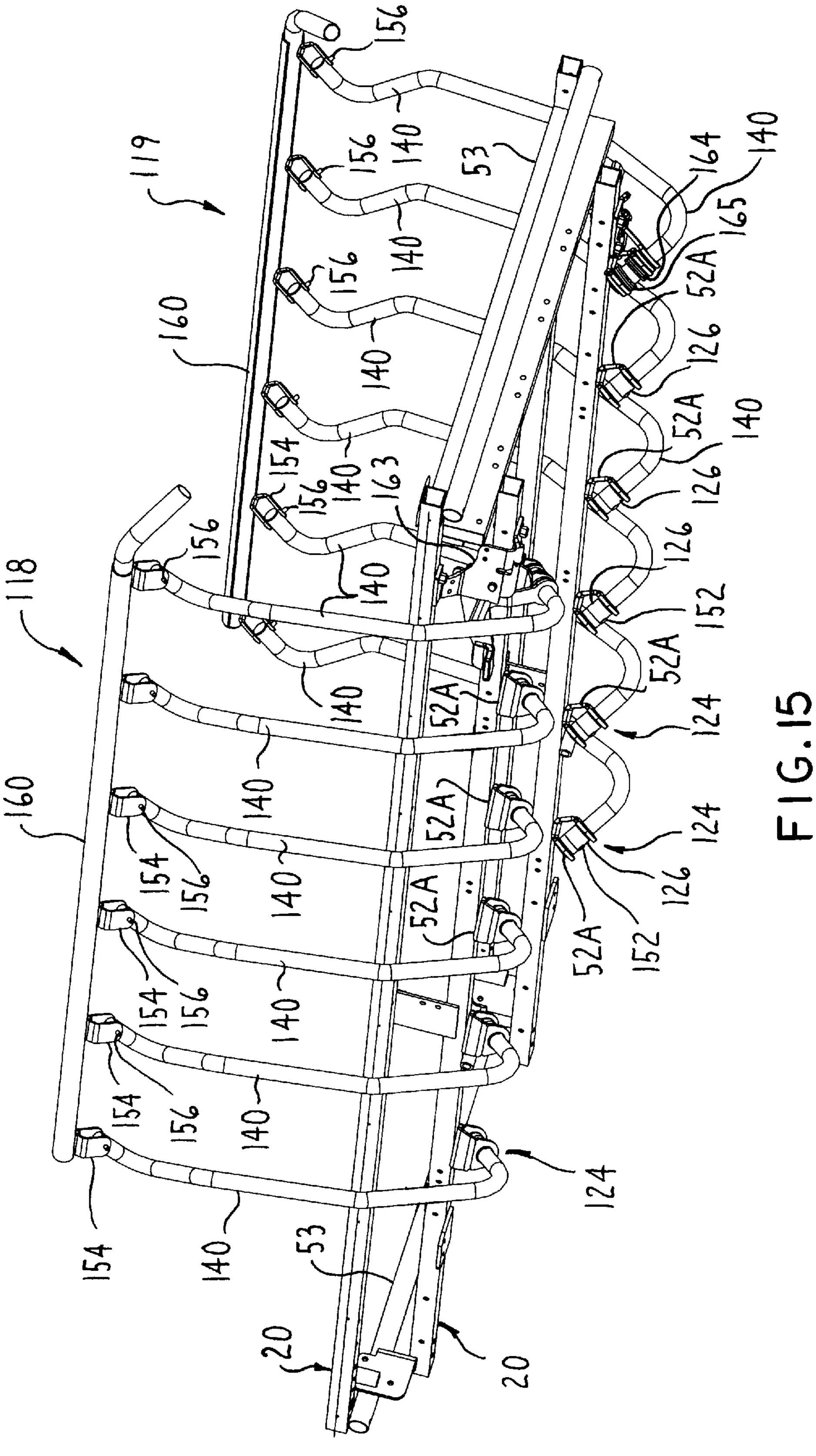
FIG. 15 is a perspective side view of side rail assemblies mounted to a patient support and in a deployed position.

The patient support 20 and the side rail assemblies 118, 119 are illustrated in FIG. 15 which is a partial view of the wheeled carriage 16 of FIG. 1 that additionally includes the side rail assemblies. FIG. 15 does not include the jacks 22, 24, the wheels 30, 32, or other elements of the bottom support section of the wheeled carriage 16. Side rail assembly 119 is a mirror image of side rail assembly 118.

Figure 16:
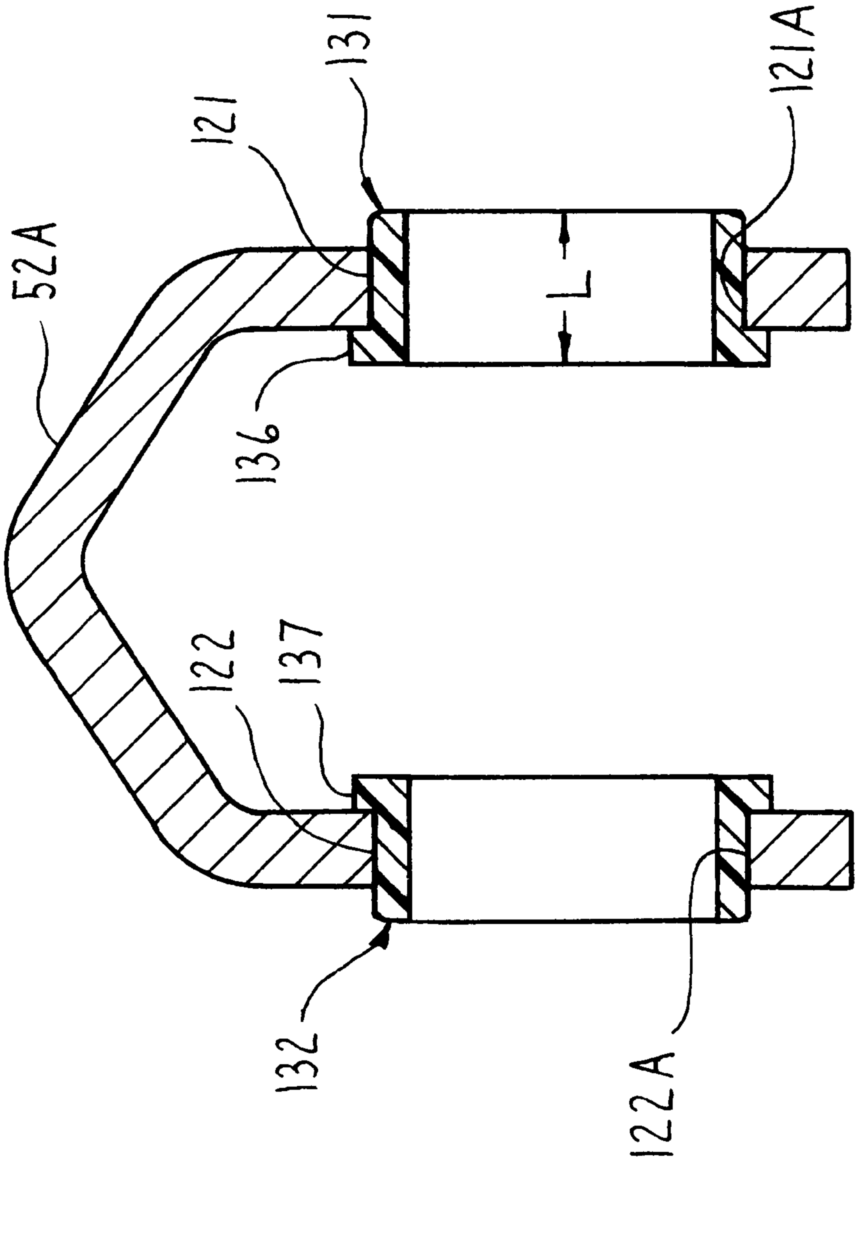
FIG. 16 is a cross-sectional view of a side rail bracket and bushings.

Side rail brackets 52A are secured to the patient support 20 by welding or the like. The side rail brackets 52A are generally secured at an angle relative to the length of the patient support 20 as shown in FIG. 15. The side rail brackets 52A have a U-shape and include bracket apertures 121, 122 for receiving other elements of a support structure 124 as illustrated in FIG. 16. The side rail brackets 52A generally comprise a metal, such as steel or aluminum, although other materials can be utilized.

Figure 17:
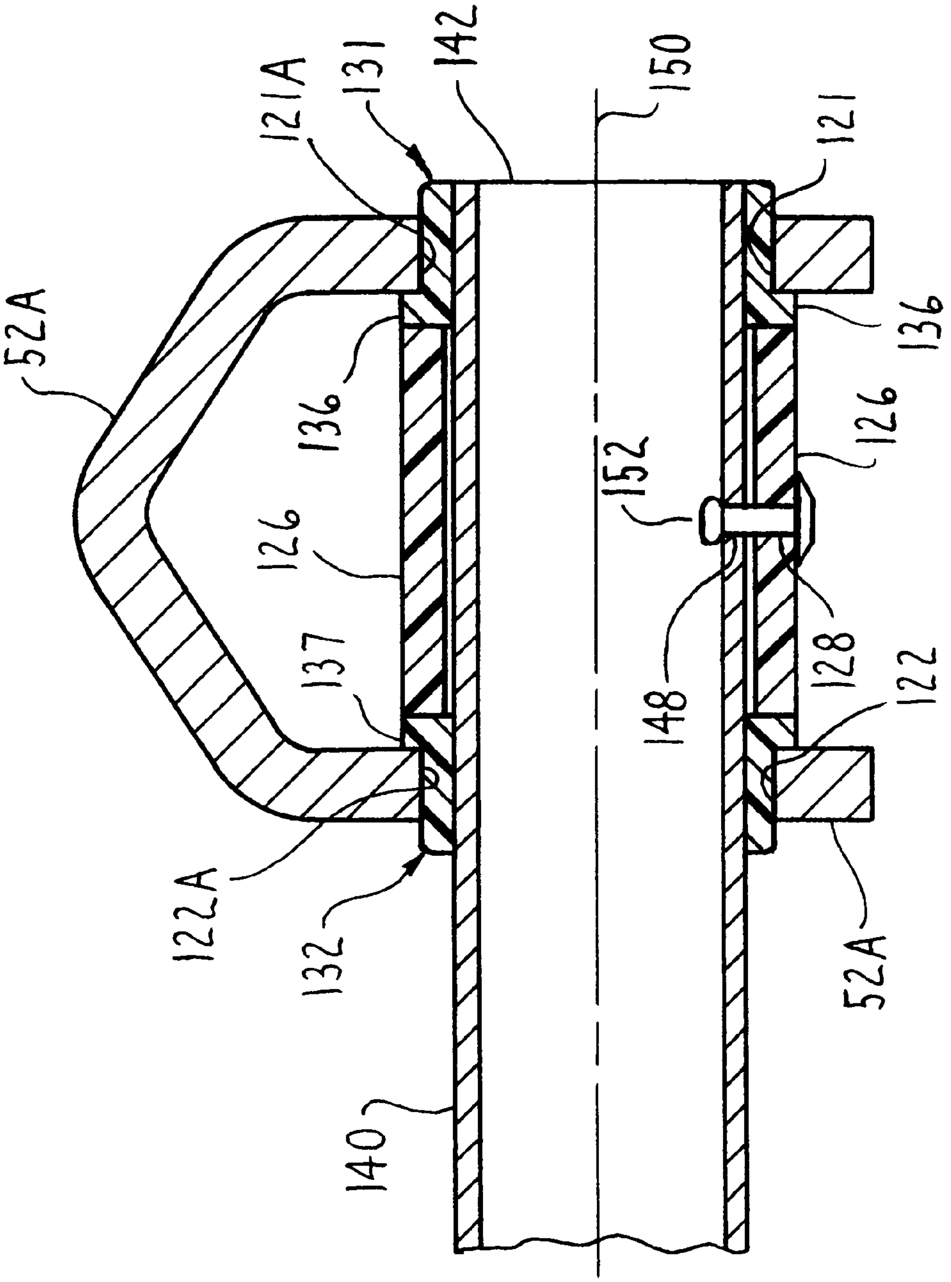
FIG. 17 is a cross-sectional view of a support structure for a side rail post.

The support structure 124 shown in the cross-sectional view of FIG. 17 includes the side rail bracket 52A and a spacer 126. The spacer 126 is hollow and positioned between apertures 121, 122 of the side rail bracket 52A. The spacer 126 has a cylindrical shape. Spacer 126 includes an outer circumference and a lesser inner circumference defining an opening through the length of the cylinder. The spacer 126 includes a support aperture 128 mounted near the center thereof and extending through the spacer in a direction substantially perpendicular to a longitudinal axis along the length of the spacer.

The spacer 126 can comprise a plastic material such as polyethylene, polypropylene, polyvinyl chloride, or other well known plastics. The spacer 126 can have a thickness of about 0.6 cm between the outer circumference and the inner circumference.

The support structure 124 includes bushings 131, 132 extending through and supported in bracket apertures 121, 122 of the side rail bracket 52 as shown in FIG. 16. As shown in FIG. 17, bushings 131, 132 are located at opposing ends of the spacer 126.

Figure 18:
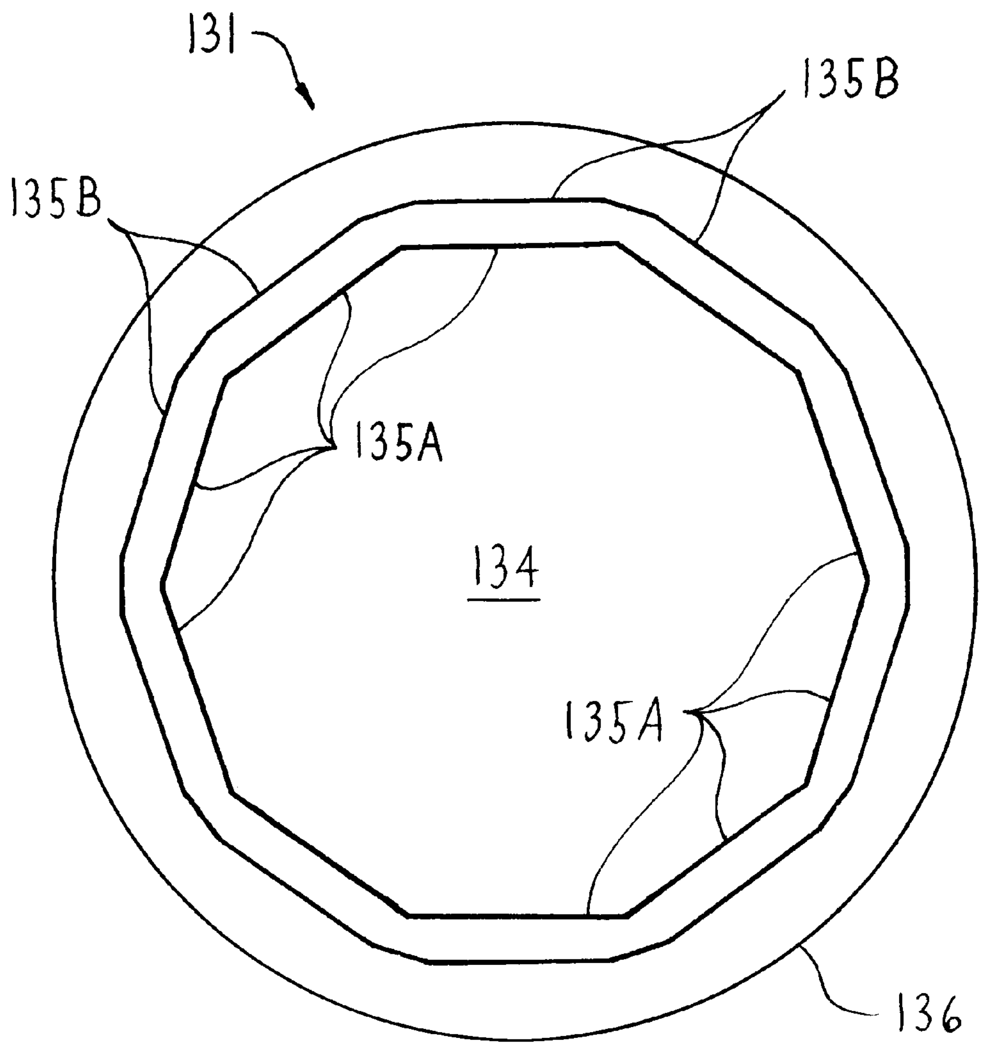
FIG. 18 is an end view of a bushing.

As shown in FIG. 18, the bushing 131 includes an opening 134 therethrough having ten equidistant inner flat sides or edges 135A about the inner circumference of portions of the bushing 131. Opening 134 extends through the entirety of the bushing 131 thus forming a passageway therethrough. Besides having ten flat sides 135A on the interior of the bushing 131, such flat sides 135B can also be provided about the exterior of the bushing. While ten flat sides 135A, 135B extending the length of the bushing are shown, any number of flat sides greater than five can be utilized in other embodiments of the invention.

Bushing 131 includes a radially outwardly extending lip 136 at one end thereof as shown in FIGS. 16–18. Likewise bushing 132 includes another radially outwardly extending lip 137 at a corresponding end thereof as shown in FIGS. 16–17. Lip 136 is positioned on the interior side of bracket aperture 121 and thus contacts an end of the spacer 126. Bushing 132 is located at a similar position adjacent the interior side of bracket aperture 122 such that the lip 137 contacts an opposing end of the spacer 126 as shown in FIG. 17.

The bushing 131 generally comprises a plastic material, such as polypropylene, polyethylene, polyvinyl chloride or other well known plastics. The lip 136 generally is an integral plastic member having a diameter and thickness substantially equivalent to the diameter and thickness of the spacer 126, for example, about 0.6 cm. The portion of the bushing 131 having flat sides 135A, 135B, however, generally has a lesser thickness. In some embodiments, such a thickness can be about 0.3 cm. Such a thickness enables the inner flat sides 135A of the bushing 131 to deform and elastically expand outwardly to receive a post, while maintaining sufficient rigidity so that the inner flat sides prevent sway or pivoting of the post. The bushing 131 has a length L extending the length of opening 134. The bushing 132 is made from the same materials and is a mirror image of the bushing 131.

As best illustrated in FIG. 17, the support structure 124 receives a side rail post 140. The side rail post has a generally cylindrical shape. The side rail post 140 preferably comprises a hollow metal tube having an inner surface about an inner radius and an outer surface about an outer radius thereof. A surface finish preferably is applied to the outer surface about an outer circumference of the side rail post 140 as well as to the outer surface of the bracket 52A. The surface finish preferably is a chrome plating extending about an entire outer circumference of the side rail post 140 and the bracket 52A. Such a surface finish improves the appearance of the metal side rail posts 140 and the bracket 52A. However, such surface finishes have an uneven thickness which provides a wider range of diameters about the outer circumference of the side rail posts 140, and thus the surface finish varies the tolerance of dimensions for the side rail posts and the diameter of the openings 121, 122 into which the bushings 131, 132 and the side rail posts are received. Therefore, the tolerances required for the support structure 124 receiving the side rail posts 140 must be increased while maintaining a snug or tight fit.

The side rail post 140 extends through the opening 134 of the bushing 131 positioned in bracket aperture 121, through the opening along the length of the spacer 126 and into the opening of the bushing 131 positioned in bracket aperture 122.

The outside edge of the lower end 142 of the side rail post 140 is intended to be flush with the edge of the end of the bushing 131 opposite from the lip 137 when mounted to the support structure 124. However, in some embodiments the lower end 142 of the side rail post 140 can extend outwardly, a distance beyond the end or edge of the bushing 131.

Figure 19A:
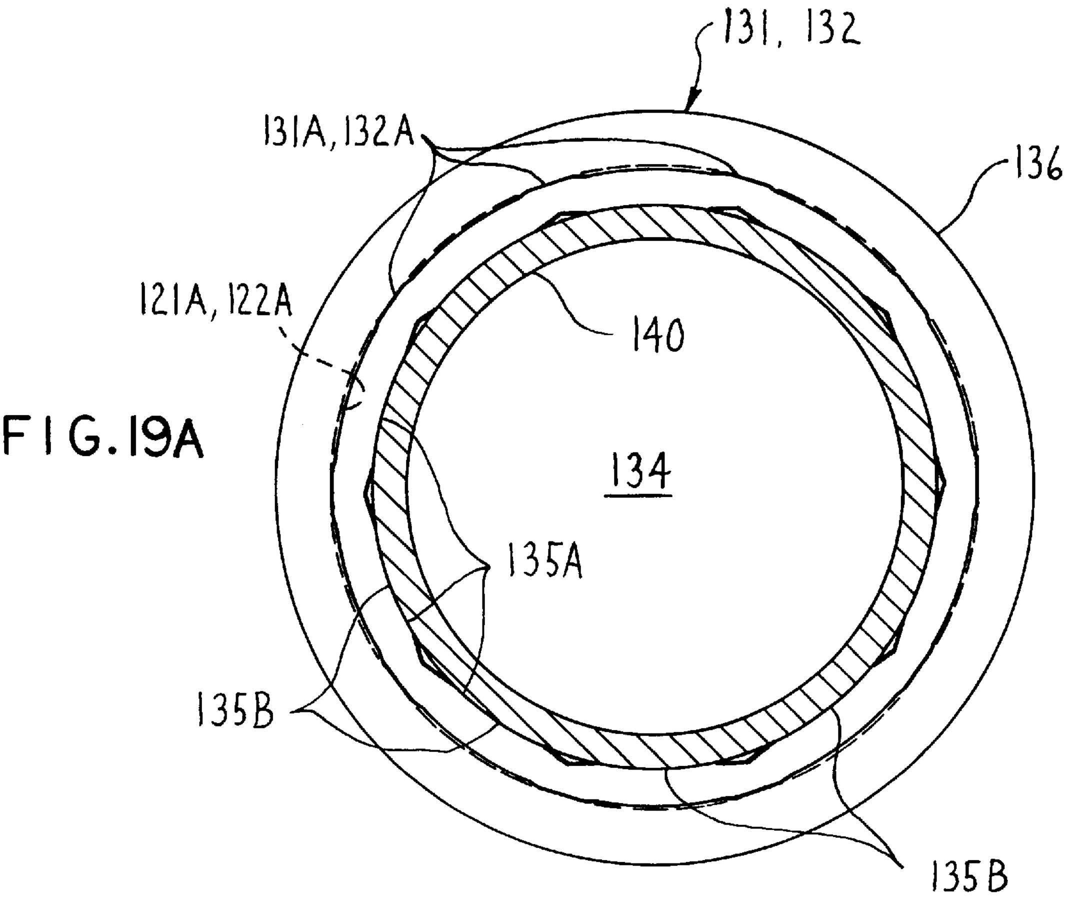
FIG. 19A is a partial view showing deformation of a bushing when a side rail post is inserted therein.
Figure 19B:
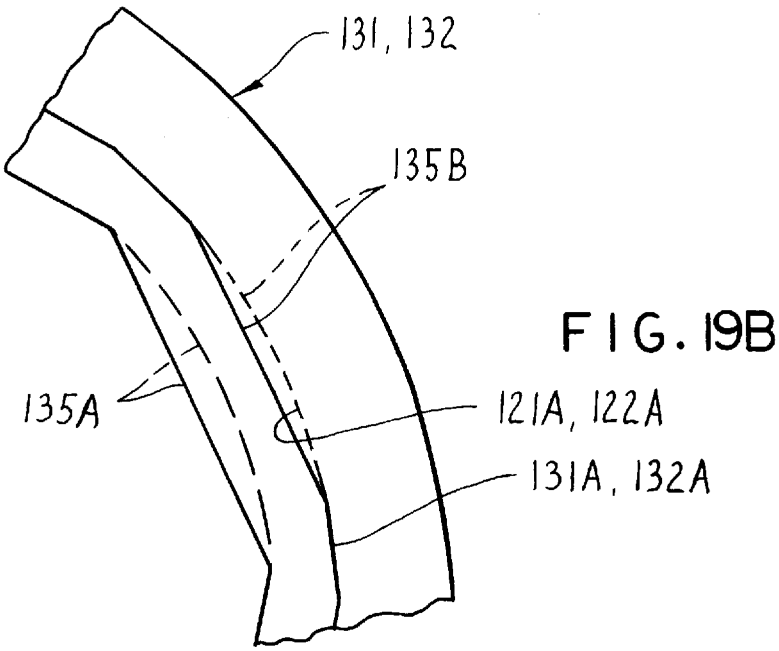
FIG. 19B is an enlarged fragment of FIG. 19A.

As shown in FIG. 19, when the side rail post 140 is forced through the opening 134 of the bushing 132 for securement to the support structure 124, the flat sides 135A, 135B at inner and outer circumferences of the bushing 132 elastically expand outwardly, without necessitating an expansion of the areas at mutually adjacent sections 132A of the bushing 132, enabling the side rail post 140 to be snugly engaged therein despite variations in the diameter of the side rail post. The inner and outer flat sides 135A, 135B are aligned with each other as shown in FIG. 18. The inner opening defined by the spacer 126 has a diameter such that the side rail post can pass therein. The second bushing 131 receives the side rail post 140 in a manner that is a mirror image of the first bushing 132. The second bushing 131 also elastically expands or deforms outwardly in the same manner as the bushing 132 shown in FIG. 19. As the inner flat sides 135A of both of the bushings 131, 132 deform outwardly, the outer flat sides 135B of the bushing expand or bow outwardly as shown in FIG. 19, to a more circular shape conforming to or nearly conforming to the internally facing wall surface 121A, 122A (FIG. 19A) of the bracket apertures 121, 122. In other words, elastic expansion of the inner flat sides of the bushings into a generally circular shape adjusts for variations in the tolerances of manufacturing and finishing of the individual components. Thus, the side rail post 140 is snugly secured to the bushings 131, 132 along the entire length of the bushing. Deformation of the inner flat sides 135A about the inner circumferences of the bushings 131, 132 enable a snug and stable connection between the support structure 124 and the side rail post 140 despite variations in the diameter of the side rail post. Due most importantly to the snug connections at the bushings 131, 132, along the lengths thereof, and the spacer between the bushings, the side rail post 140 does not sway or have any significant movement in a perpendicular direction when forces are applied laterally thereto. Such a result is obtained whether the side rail post 140 is stationary or being moved upwardly or downwardly between deployed and stowed positions, except for movement away from or under and toward the lateral edge of the patient support 20 due to the curved shape of the side rail post 140. However, even during such movement, especially the snug connections between the side rail post 140 and the bushings 131, 132 prevent play or movement of the side rail post with respect to the bushings.

As shown in FIG. 17, the side rail post 140, spacer 126, and bushings 131, 132 can rotate about a longitudinal axis 150 extending along a direction of the length of the side rail post adjacent the lower end 142 thereof. The bushings 131, 132 may be frictionally fixed to the internally facing wall surface 121A, 122A (FIG. 19A) of the respective bracket apertures 121, 122, respectively. Thus, the lower end of the side rail post 140 acts as an axle when rotating about the longitudinal axis 150. In this manner, the side rail post 140 can be rotated between stowed and deployed positions.

As shown in FIG. 17, the side rail post 140 has a post aperture 148 extending therethrough. The post aperture 148 is near the lower end 142 of the side rail post 140. The post aperture 148 can be aligned with the support aperture 128 while the lower end 142 is substantially flush with the outer edge of bushing 132. A rivet 152, such as a pop rivet, is placed in the outside of the hollow side rail post 140 and extends inwardly of the post through the post aperture 148 and through the support aperture 128. The inwardly extending end of the rivet 152 is deformed. A self-tapping screw could be used instead of the rivet. Such securement of the side rail post 140 to the spacer 126 prevents movement of the side rail post along the longitudinal axis 150. Thus, the side rail post 140 can only rotate about the longitudinal axis 150.

The side rail posts 140 have a contorted or multiple curved shape as shown in FIG. 15. Such compound angle of the axis of rotation enables the side rail posts 140 to rotate underneath a metal beam of the patient support 20 allowing storage below a lateral side edge of the carriage 16.

Figure 20:
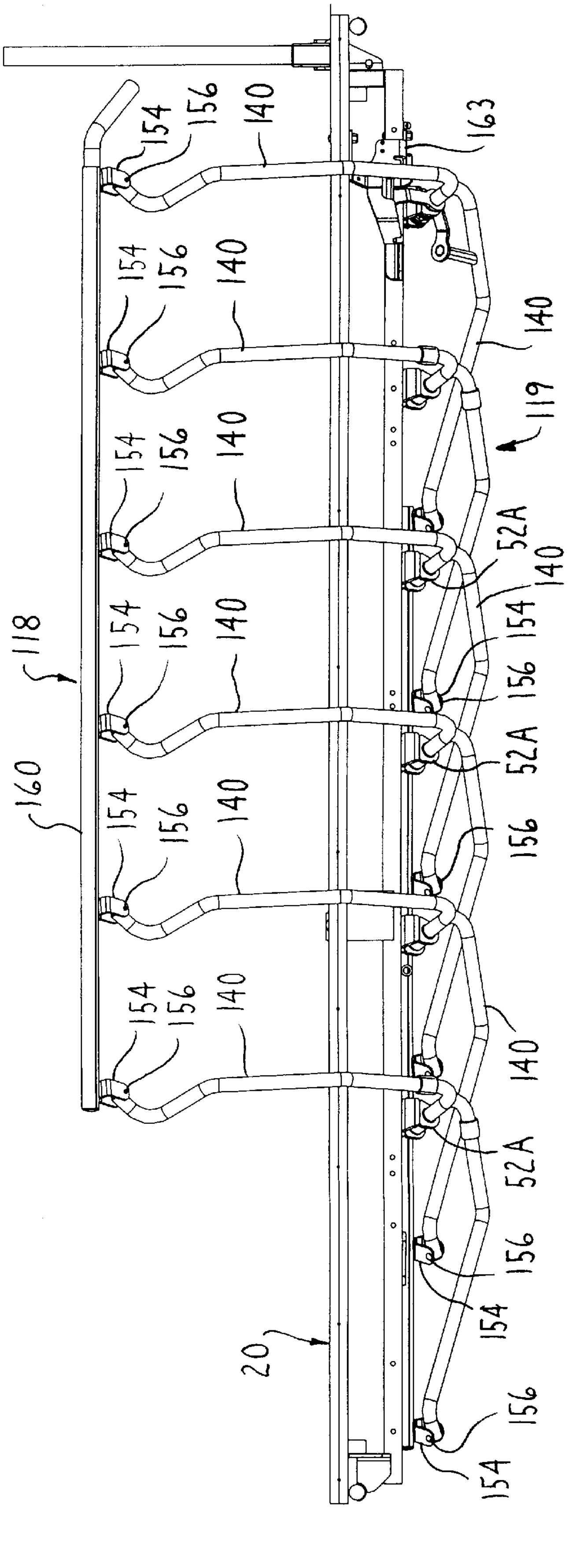
FIG. 20 is a side view of a patient support having a side rail assembly in a deployed position and a side rail assembly in a stored position.

The side rail posts 140 are secured to upper support brackets 154 by support bolts 156 as shown in FIGS. 15 and 20. The upper support brackets 154 preferably have a U-shape and comprise a metal such as steel or the like, although other materials can also be utilized.

The support bolts 156 about which the side rail posts 140 pivot can also comprise metal such as steel, or other appropriate material.

A side rail 160 of the side rail assembly 118 is fixedly secured to a plurality of the upper support brackets 154 by welding or other means of attachment.

The side rail 160 generally comprises a metal tube made of aluminum, steel or other appropriate materials. Like the side rail posts, the side rail 160 can have a finished surface to improve the appearance of the rail.

Figure 21:
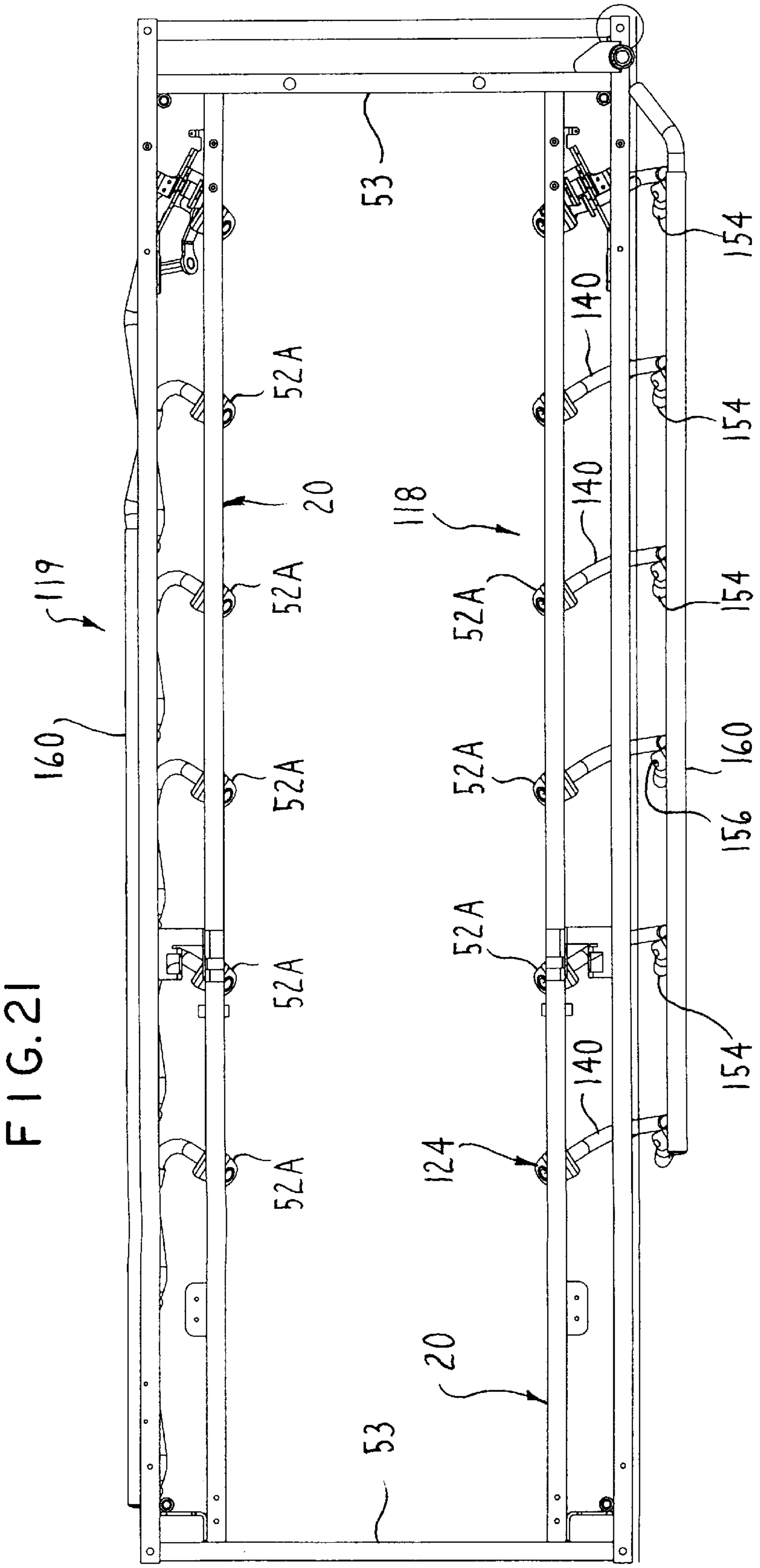
FIG. 21 is a top view of a patient support having a side rail assembly in a deployed position and a side rail assembly in a stored position.

The side rail 160 moves upwardly and downwardly with the plurality of side rail posts 140 pivotally secured thereto. However, the side rail 160 always remains in a substantially horizontal position. Movement sideways or in a direction along the length thereof, coupled with upward or downward movement between deployed and stowed positions does occur due to the compound angle of the axis of rotation 150. The curved shape of the side rail posts 140 enable the posts to rotate or pivot the side rail 160 downwardly to a stowed or stored position under a lateral edge of the wheeled carriage 16 as shown in FIGS. 20 and 21. See also the aforementioned U.S. Pat. No. 5,187,824 to Martin Stryker.

The side rail assembly 118 is locked or latched in the upright or raised position to protect a patient as shown in FIGS. 15, 20, and 21. A latch mechanism 163, illustrated in FIG. 20, maintains the side rail 160, and the side rail posts 140 connected thereto, in a raised or upright position. The latch mechanism 163 has a release enabling downward movement of the side rail 160 to a stored position. Another exemplary latch mechanism, which can be utilized for the invention of FIG. 15, is disclosed in U.S. Pat. No. 5,187,824, which earlier in this disclosure has been incorporated by reference. Further, other conventional or known latch mechanisms may be utilized with the side rail assemblies 118, 119 of the invention.

At least one of the support structures 124 for each side rail assembly 118, 119 includes at least one torsion spring, and preferably two torsion springs 164, 165 as shown in FIG. 15. The torsion springs 164, 165 preferably are metal springs. However, plastic or other materials having the appropriate elasticity can be utilized.

Figure 22:
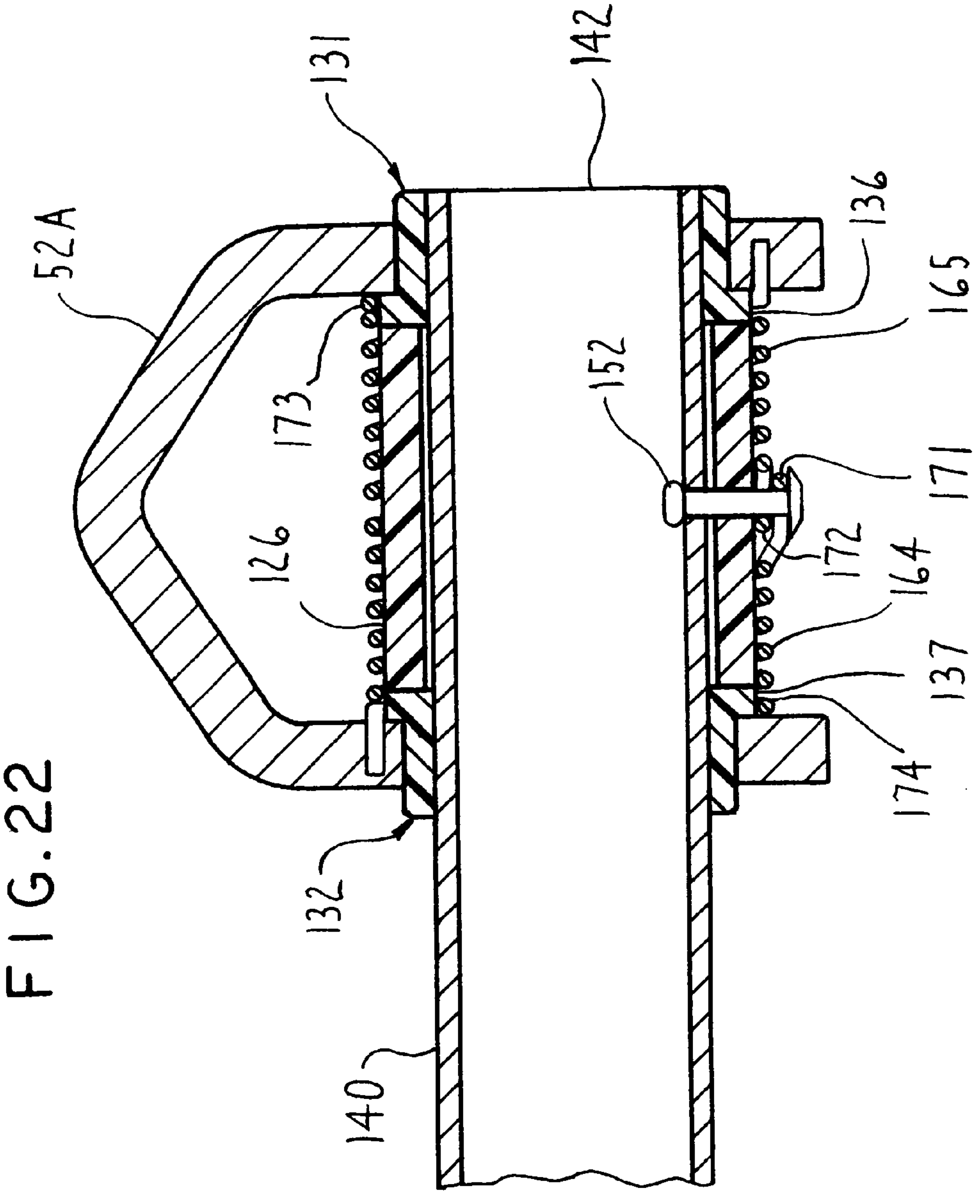
FIG. 22 is a cross-sectional view of a support structure including torsion springs.

FIG. 22 better illustrates the torsion springs 164, 165. Respective first ends 171, 172 of the torsion springs 164, 165 are secured to the rivet 152 or other type fastener. Second ends 173, 174 of the torsion springs 164, 165 are secured by hooking them to the opposing arms of the side rail bracket 52A.

When the respective side rails 160 are in the raised position shown in FIG. 15, the torsion springs 164, 165 are generally relaxed or unstressed. When a respective side rail 160 is lowered, both of the torsion springs 164, 165 oppose or resist the downward force of gravity acting on the side rail 160 and the side rail posts 140. Thus the side rail assembly 118 does not quickly rotate to the storage position.

When the respective side rail 160 is in the stowed or stored position, the energy stored in the torsion springs 164, 165 assists an attendant raising the side rail assembly 118 by decreasing the amount of force required to raise the side rail. As the side rail 160 is raised, the energy in the torsion springs 164, 165 is released. Therefore, the torsion springs 164, 165 assist in raising the side rail 160 from a stored position and oppose downward movement of the side rail.

In the above disclosure, references to and descriptions of a single support structure 124, a single side rail post 140, or other elements, disclosed and shown throughout the specification and drawings, can be considered a description of the plurality of other support structures, other side rail posts, and other duplicate elements having the same reference numeral.

Although particular preferred embodiments of the invention have been disclosed in detail for illustrative purposes, it will be recognized that variations or modifications of the disclosed apparatus, including the rearrangement of parts, lie within the scope of the present invention.

What is claimed is:

1. A wheeled carriage for supporting a patient in a substantially horizontal position, said wheeled carriage having a center of gravity and a force $F_{mass}$ at the center of gravity due to the mass of said carriage or the mass of a combination of said carriage and a patient thereon, said wheeled carriage comprising:

a patient support having a length, opposing ends of the length comprising a head end and a foot end of said patient support, said patient support having a pair of lateral sides intermediate the head and foot ends;

a wheeled base having a length and supporting said patient support and enabling movement of said patient support, said wheeled base including at least four floor surface engaging and castered wheels spaced from one another, said wheeled base of said wheeled carriage having a first edge at a first end corresponding to the head end of said patient support and a second edge at a second end corresponding to the foot end of said patient support;

a gripping location at the head end of said patient support, said gripping location being utilized to apply a force $F_{max}$ to said carriage sufficient to overcome friction and move said wheeled carriage;

an auxiliary wheel mechanism including an auxiliary wheel support structure for rotatably supporting at least one auxiliary wheel at an axis thereof to said wheeled base, said at least one auxiliary wheel being uncastered, the axis of said at least one auxiliary wheel being secured to said wheeled base at a distance L in a horizontal direction from the center of gravity along the length of said wheeled base when said auxiliary wheel is engaged with the floor surface, a moment $M_{mass}$ being defined by the distance L multiplied by the force $F_{mass}$; and control apparatus for effecting a movement of said support structure and said at least one auxiliary wheel between a first position whereat said auxiliary wheel is engaged with the floor surface and a second position whereat said auxiliary wheel is out of engagement with the floor surface, wherein, when said auxiliary wheel is in engagement with the floor surface, the height H defined by the axis of said auxiliary wheel and the relative height of said gripping location creates a moment $M_{force}$ defined by multiplying the height H by the force $F_{max}$, the distance L being great enough such that the moment $M_{mass}$ is greater than the moment $M_{force}$ when any size and weight of patient is placed on the patient support having their head toward the head end thereof, such that said wheeled carriage does not teeter between said castered wheels on respective ends of said carriage during movement thereof.

2. The wheeled carriage of claim 1, wherein said wheeled base of said wheeled carriage has a first edge at a first end corresponding to the head end of said patient support and a second edge at a second end corresponding to the foot end of said patient support, said wheeled base of said wheeled carriage having an imaginary transverse centerline located at a midpoint of the length of said wheeled base, the distance L having a value such that, when said auxiliary wheel is engaged with the floor surface, the axis of said at least one auxiliary wheel is spaced away from the centerline located at the midpoint and toward the second edge of said wheeled base.

3. The wheeled carriage of claim 2, wherein the axis of said auxiliary wheel is spaced toward the second edge of said wheeled base by a distance corresponding to at least 15% of the distance from the centerline at the midpoint of said wheeled base to the second edge of said wheeled base.

4. The wheeled carriage of claim 1, wherein the distance L has a value such that the axis of said 10 auxiliary wheel is located at a position corresponding to about two-thirds of the length of said wheeled base, and toward the second edge thereof, when said at least one auxiliary wheel contacts the floor.

5. The wheeled carriage of claim 1, wherein said at least one auxiliary wheel includes a second auxiliary wheel parallel to said first auxiliary wheel and having the same axis.

6. The wheeled carriage of claim 1, wherein said control apparatus includes support means for elevating and lowering two of said floor surface engaging wheels adjacent said foot end.

7. A wheeled carriage for supporting a patient in a substantially horizontal position, comprising:

a patient support having a length, opposing ends of the length comprising a head end and a foot end of said patient support, said patient support having a pair of lateral sides intermediate the head and foot ends;

a wheeled base having a length and supporting said patient support and enabling movement of said patient support, said wheeled base including at least four floor surface engaging and castered wheels spaced from one another, said wheeled carriage having a first edge corresponding to the head end of said patient support and a second edge corresponding to the foot end of said patient support, said wheeled base having an imaginary transverse centerline located at a midpoint of the length of said wheeled base and dividing said wheeled base;

an auxiliary wheel mechanism including an auxiliary wheel support structure for suspendedly supporting at least one auxiliary wheel at an axis thereof to said wheeled base, said at least one auxiliary wheel being uncastered; and control apparatus for effecting a movement of said auxiliary wheel support structure and said at least one auxiliary wheel between a first position whereat said auxiliary wheel is engaged with the floor surface, the axis of said auxiliary wheel being spaced from the centerline at the midpoint of said wheeled base toward the second edge of said wheeled base, and a second position whereat said auxiliary wheel is out of engagement with the floor surface.

8. The wheeled carriage of claim 7, wherein the axis of said auxiliary wheel is spaced toward the second edge of said wheeled base by a horizontal distance corresponding to at least 15% of the distance from the centerline at the midpoint of said wheeled base to the second edge of said wheeled base, the distance from the centerline at the midpoint of said wheeled base to the first edge of said wheeled base being substantially the same as the distance from the centerline at the midpoint of said wheeled base to the second edge of said wheeled base.

9. The wheeled carriage of claim 7, wherein the axis of said auxiliary wheel is located on said wheeled base at a position corresponding to about two-thirds of the length of said wheeled base when said auxiliary wheel contacts the floor surface.

10. The wheeled carriage of claim 7, wherein said at least one auxiliary wheel includes a second auxiliary wheel parallel to said first auxiliary wheel and having the same axis.

11. The wheeled carriage of claim 7, wherein said control apparatus includes a manipulatable member, a rotatable shaft, and a cam apparatus linked to said rotatable shaft to move a cam follower in response to rotation of said shaft, said cam follower being secured to said auxiliary wheel support structure.

12. A wheeled carriage for supporting a patient in a substantially horizontal position, comprising:

a patient support having head and foot ends and a pair of lateral sides intermediate said head and foot ends and a wheeled base supported on at least four floor surface engaging and castered wheels spaced from one another at locations defining corners of a theoretical polygon;

an auxiliary wheel mechanism including an auxiliary wheel support structure for suspendedly mounting at least one auxiliary wheel to said wheeled base, said at least one auxiliary wheel being oriented inside a boundary of the theoretical polygon and including an axle about which said wheel rotates, said axle being mounted to said auxiliary wheel support structure and being uncastered;

control apparatus for effecting a movement of said wheel support structure and said at least one auxiliary wheel between a first position whereat said auxiliary wheel is engaged with said floor surface and a second position whereat said at least one auxiliary wheel is out of engagement with the floor surface, said control apparatus including a rotatable shaft oriented on an axis parallel to a longitudinal axis of said rectangular patient support and having a first manually manipulatable member connected to said rotatable shaft, said first manually manipulatable member being oriented adjacent at least one of said head and foot ends; and cam apparatus including a first cam linkage having a first end secured to said rotary shaft of said control apparatus, a second cam linkage secured to a second end of said first cam linkage, an end of said second cam linkage being secured to a cam, and a cam follower being manipulated by said cam, said cam follower including an axle fixedly secured to said auxiliary wheel support structure, said first cam linkage having a position control member, said position control member preventing said cam linkage from contacting a floor surface during movement thereof.

13. The wheeled carriage of claim 12, wherein said second cam linkage comprises a slotted cam linkage for receiving a roller element at the second end of said first cam linkage.

14. The wheeled carriage of claim 12, wherein rotation of said rotatable shaft in a first direction moves said at least one auxiliary wheel to a raised position and rotation of said rotatable shaft in an opposing second direction moves said at least one auxiliary wheel to a second position in contact with the floor surface.

15. The wheeled carriage of claim 12, wherein said control apparatus includes a return spring secured to said auxiliary wheel support structure to move said cam follower to a raised position when said cam follower is released from a depression at an end of said cam and is free to enter an open slot of said cam.

16. The wheeled carriage of claim 15, wherein said control apparatus further includes a dashpot secured to the end of said cam to prevent sudden movement of said cam follower after release from the depression at the end of said cam.

17. The wheeled carriage of claim 12, wherein said cam has a rounded surface for contact with a roller of said cam follower.

18. The wheeled carriage of claim 17, wherein said roller of said cam follower has a contoured shape and raised edges to enable the surface of said roller to fit the surface of said cam.

19. The wheeled carriage of claim 12, wherein said at least one auxiliary wheel includes a second spaced auxiliary wheel parallel to said one auxiliary wheel.

20. The wheeled carriage of claim 19, wherein said auxiliary wheel support structure includes a yoke secured to both of said auxiliary wheels.

21. The wheeled carriage of claim 12, wherein said second cam linkage includes an extended portion, said extended portion contacting said position control member during movement of said first and second linkages to prevent said linkages from contacting the floor surface.

* * * * *

UNITED STATES PATENT AND TRADEMARK OFFICE
CERTIFICATE OF CORRECTION

PATENT NO. : 6,256,812 B1 
DATED : July 10, 2001
INVENTOR(S) : Richard J. Bartow et al.

It is certified that error appears in the above-identified patent and that said Letters Patent is hereby corrected as shown below:

Title page,
Item [54], delete "AND DEPLOYABLE SIDE RAILS FOR THE WHEELED CARRIAGE"

Column 16,
Line 55, delete "10"

Column 17,
Line 11, after "wheeled", insert -- base of said wheeled --
Line 19, after "least one" insert -- uncastered --
Lines 20-22, delete "said at least one auxiliary wheel being uncastered; and control apparatus for effecting a movement of"
Delete lines 24-31, and insert -- auxiliary wheel being movable between a first deployed position whereat that auxiliary wheel is engaged with the floor surface, the axis of said auxiliary wheel being spaced from the centerline at the midpoint of said wheeled base toward the second edge of said wheeled base, and a second stored position whereat said auxiliary wheel is out of engagement with the floor surface; and control apparatus for effecting movement of said auxiliary wheel support structure and said at least one auxiliary wheel between the first deployed position and the second stored position. --

Column 18,
After line 65, insert
-- 22. The wheeled carriage of Claim 1, wherein the radius of said at least one uncastered auxiliary wheel is greater than the radius of said castered wheels to decrease the amount of force required to overcome the friction of the castered wheels and the at least one auxiliary wheel, and initiate and maintain movement of the wheeled carriage.

UNITED STATES PATENT AND TRADEMARK OFFICE

CERTIFICATE OF CORRECTION

PATENT NO. : 6,256,812 B1
DATED : July 10, 2001
INVENTOR(S) : Richard J. Bartow et al.

It is certified that error appears in the above-identified patent and that said Letters Patent is hereby corrected as shown below:

Column 18 cont'd,

23. The wheeled carriage of Claim 7, wherein the radius of said at least one uncastered auxiliary wheel is greater than the radius of said castered wheels to decrease the amount of force required to overcome the friction of the castered wheels and the at least one auxiliary wheel, and initiate and maintain movement of the wheeled carriage.

24. The wheeled carriage of Claim 12, wherein the radius of said at least one uncastered auxiliary wheel is greater than the radius of said castered wheels to decrease the amount of force required to overcome the friction of the castered wheels and the at least one auxiliary wheel, and initiate and maintain movement of the wheeled carriage. --

Signed and Sealed this

Twenty-eighth Day of January, 2003

JAMES E. ROGAN
*Director of the United States Patent and Trademark Office*